(12) United States Patent
Tsukamoto et al.

(10) Patent No.: US 11,142,080 B2
(45) Date of Patent: Oct. 12, 2021

(54) METHOD FOR CONTROLLING NON-CONTACT ELECTRIC POWER SUPPLY SYSTEM, AND NON-CONTACT ELECTRIC POWER SUPPLY SYSTEM

(71) Applicant: NISSAN MOTOR CO., LTD., Yokohama (JP)

(72) Inventors: Yukinori Tsukamoto, Kanagawa (JP); Shihang Mo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/619,151

(22) PCT Filed: Jun. 13, 2017

(86) PCT No.: PCT/JP2017/021771
§ 371 (c)(1),
(2) Date: Dec. 4, 2019

(87) PCT Pub. No.: WO2018/229858
PCT Pub. Date: Dec. 20, 2018

(65) Prior Publication Data
US 2020/0156488 A1    May 21, 2020

(51) Int. Cl.
*H01F 27/42*      (2006.01)
*H01F 37/00*      (2006.01)
(Continued)

(52) U.S. Cl.
CPC ............ *B60L 53/12* (2019.02); *B60R 25/245* (2013.01); *G07C 9/00182* (2013.01);
(Continued)

(58) Field of Classification Search
CPC .......... B60L 53/12; B60L 53/36; B60L 53/37; B60L 53/38; H02J 50/10; H02J 50/70
See application file for complete search history.

(56) References Cited

U.S. PATENT DOCUMENTS

2014/0092243 A1*   4/2014   Ichikawa .............. B60L 11/182
                                              348/143
2014/0333256 A1*   11/2014   Widmer .................. B60L 53/30
                                              320/108
(Continued)

FOREIGN PATENT DOCUMENTS

JP            6036348 B2    11/2016

*Primary Examiner* — Hal Kaplan
*Assistant Examiner* — Rasem Mourad
(74) *Attorney, Agent, or Firm* — Foley & Lardner LLP

(57) ABSTRACT

A method for controlling a non-contact electric power supply system in which an electric power receiving coil mounted on a host vehicle is opposed to an electric power transmitting coil set on a ground, the non-contact electric power supply system supplying electric power from the electric power transmitting coil to the electric power receiving coil in a non-contact manner and, when a moving object is detected in a detection region around the electric power receiving coil or the electric power transmitting coil during the electric power supply, stopping or reducing the electric power supply, the method including: determining whether another vehicle is parked around the host vehicle; and expanding, when determining that the other vehicle is parked, the detection region as compared to when not determining that the other vehicle is parked.

8 Claims, 19 Drawing Sheets

(51) Int. Cl.
    *H01F 38/00* (2006.01)
    *B60L 53/12* (2019.01)
    *H02J 50/10* (2016.01)
    *H02J 50/70* (2016.01)
    *B60R 25/24* (2013.01)
    *G07C 9/00* (2020.01)

(52) U.S. Cl.
    CPC .............. *H02J 50/10* (2016.02); *H02J 50/70* (2016.02); *G07C 2009/00793* (2013.01)

(56) References Cited

U.S. PATENT DOCUMENTS

| | | | |
|---|---|---|---|
| 2016/0039302 A1* | 2/2016 | Schwab | B60L 53/62 320/108 |
| 2016/0178740 A1* | 6/2016 | Sieber | B60L 53/36 342/43 |

* cited by examiner

METHOD FOR CONTROLLING NON-CONTACT ELECTRIC POWER SUPPLY SYSTEM, AND NON-CONTACT ELECTRIC POWER SUPPLY SYSTEM

TECHNICAL FIELD

The present invention relates to a method for controlling a non-contact electric power supply system and a non-contact electric power supply system.

BACKGROUND ART

In a non-contact electric power supply system that transmits electric power in a non-contact manner, from an electric power transmitting device provided on the ground side to an electric power receiving device mounted on a vehicle, and charges a battery mounted on the vehicle, it is likely that since a large amount of electric power is transmitted, wireless communication by a weak radio wave used for a keyless entry system (a system for locking and unlocking a door without inserting a key into a keyhole) is affected by a leakage in the magnetic field and the keyless entry system malfunctions. Patent Literature 1 discloses that electric power supply is stopped when wireless communication is to be performed between a portable machine carried by an occupant and a host vehicle during non-contact electric power supply, and the electric power supply is started again once the wireless communication ends.

CITATION LIST

Patent Literature

Patent Literature 1: Japanese Patent No. 6036348

SUMMARY OF INVENTION

However, in the conventional example disclosed in Patent Literature 1, the electric power supply can be stopped to prevent malfunction of the keyless entry system when the occupant of the host vehicle operates the keyless entry system. However, influence on a keyless entry system of another vehicle parked adjacent to the host vehicle is not considered. Therefore, it is likely that when the host vehicle is carrying out the non-contact electric power supply, wireless communication of the keyless entry system of the other vehicle adjacent to the host vehicle is affected, and the keyless entry system of the other vehicle malfunctions.

The present invention has been made in order to solve such a problem in the past, and an object of the present invention is to provide a method for controlling a non-contact electric power supply system and a non-contact electric power supply system capable of avoiding a situation when a host vehicle is carrying out non-contact electric power supply in which the non-contact electric power supply affects wireless communication of keyless entry systems of the host vehicle and another vehicle adjacent to the host vehicle.

An aspect of the present invention is a method for controlling a non-contact electric power supply system that stops or reduces electric power supply when, during non-contact electric power supply, a moving object is detected in a detection region around an electric power receiving coil or an electric power transmitting coil. When another vehicle is parked adjacent to a host vehicle, the detection region is expanded as compared to when another vehicle is not parked.

Advantageous Effects of Invention

According to an aspect of the present invention, it is possible to avoid a situation in which the wireless communication of the keyless entry systems of the host vehicle and the other vehicle are affected.

DESCRIPTION OF EMBODIMENTS

Embodiments of the present invention are explained below with reference to the drawings.

Explanation of a First Embodiment

Figure 1:
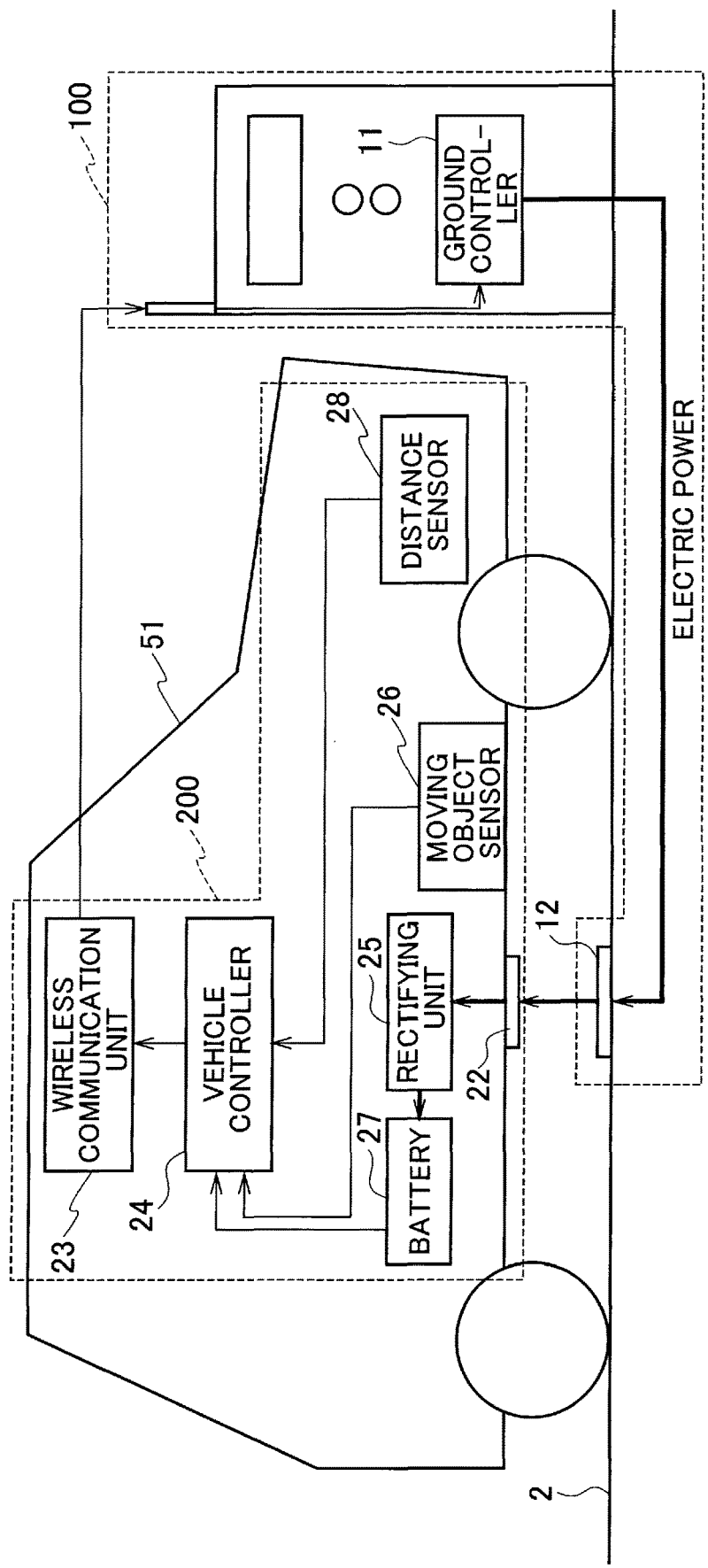
FIG. 1 is a block diagram showing the configuration of a non-contact electric power supply system according to a first embodiment of the present invention.

FIG. 1 is a block diagram showing the configuration of a non-contact electric power supply system according to a first embodiment. As shown in FIG. 1, the non-contact electric power supply system includes an electric power supply device 100, which is a ground side unit, and an electric power receiving device 200, which is a vehicle side unit. The non-contact electric power supply system supplies electric power in a non-contact manner from the electric power supply device 100 disposed in an electric power supply station or the like to the electric power receiving device 200 mounted on a host vehicle 51 such as an electric automobile or a hybrid car.

The electric power supply device 100 includes an electric power transmitting coil 12 disposed in a parking space 2 near the electric power supply station. The electric power supply device 100 includes a ground controller 11 (an electric power supply control circuit). The electric power receiving device 200 includes an electric power receiving coil 22 set on the bottom surface of the host vehicle 51. The electric power receiving coil 22 is opposed to right above the electric power transmitting coil 12 when the host vehicle 51 is parked in a predetermined parking position (an electric power suppliable position) of the parking space 2.

The electric power transmitting coil 12 is configured by a primary coil formed by a conductive wire and transmits electric power to the electric power receiving coil 22. The electric power receiving coil 22 is configured by a secondary coil also formed by a conductive wire and receives the electric power transmitted from the electric power transmitting coil 12. It is possible to supply electric power, in a non-contact manner, from the electric power transmitting coil 12 to the electric power receiving coil 22 with electromagnetic induction action between the electric power transmitting coil 12 and the electric power receiving coil 22.

The ground controller 11 includes an inverter configured by a switching element. The ground controller 11 rectifies AC electric power transmitted from an AC power supply (not shown in the figure), converts the AC electric power into AC electric power having a higher frequency, and supplies the AC electric power to the electric power transmitting coil 12. The ground controller 11 controls electric power supply to the electric power transmitting coil 12 and a stop of the electric power supply. Further, the ground controller 11 can change electric power supplied to the electric power transmitting coil 12. The ground controller 11 has a function of wireless communication and performs bidirectional communication between the ground controller 11 and a wireless communication unit 23 provided in the electric power receiving device 200 of the host vehicle 51.

The electric power receiving device 200 includes the electric power receiving coil 22, the wireless communication unit 23, a vehicle controller 24, a rectifying unit 25, a battery 27, a moving object sensor 26, and a distance sensor 28.

The rectifying unit 25 rectifies AC electric power received by the electric power receiving coil 22 and charges the battery 27 with the DC rectified electric power.

The distance sensor 28 detects an object such as another vehicle present around the host vehicle 51 and further measures the distance to the detected object. A sonar or a camera can be used as the distance sensor 28. The distance sensor 28 outputs detected distance data to the vehicle controller 24.

The moving object sensor 26 detects a moving object such as a pedestrian present around the host vehicle 51. A Doppler sensor or a camera can be used as the moving object sensor 26. The moving object sensor 26 has a function of adjusting a detection range of the moving object. The detection range can be changed as indicated by a region R1 shown in FIG. 6A and a region R11 shown in FIG. 6B explained below according to the control by the vehicle controller 24.

The vehicle controller 24 monitors a charging state of the battery 27 and transmits present electric power information and an electric power request signal to the ground controller 11 of the electric power supply device 100 via the wireless communication unit 23. The vehicle controller 24 transmits distance data to the object detected by the distance sensor 28 and detection data of the moving object detected by the moving object sensor 26 to the ground controller 11. Further, when another vehicle adjacent to the host vehicle 51 is detected by the distance sensor 28, the vehicle controller 24 executes control for changing the detection region of the moving object sensor 26.

The wireless communication unit 23 performs bidirectional communication between the wireless communication unit 23 and the ground controller 11. The battery 27 is configured by connecting a plurality of secondary cells and functions as an electric power source of the host vehicle 51.

With such a configuration, the non-contact electric power supply system performs electric power transmission and electric power reception of high-frequency electric power in a non-contact state with the electromagnetic induction action between the electric power transmitting coil 12 and the electric power receiving coil 22. That is, electric power is supplied to the electric power transmitting coil 12, whereby magnetic coupling occurs between the electric power transmitting coil 12 and the electric power receiving coil 22, and electric power is supplied from the electric power transmitting coil 12 to the electric power receiving coil 22. The electric power supplied to the electric power receiving coil 22 is rectified by the rectifying unit 25 and thereafter charged in the battery 27.

Note that the ground controller 11 and the vehicle controller 24 explained above can be realized using a microcomputer including a CPU (central processing unit), a memory, and an input and output unit. A computer program for causing the microcomputer to function as the ground controller 11 or the vehicle controller 24 is installed in the microcomputer and executed. Consequently, the microcomputer functions as a plurality of processing circuits included in the ground controller 11 or the vehicle controller 24. Note that an example is explained in which the ground controller 11 or the vehicle controller 24 is realized by software. However, naturally, a configuration using dedicated hardware may be adopted.

Explanation of the Distance Sensor and the Moving Object Sensor

Details of the distance sensor 28 and the moving object sensor 26 explained above are explained. In this embodiment, sonars are used as the distance sensors 28 and Doppler sensors are used as the moving object sensors 26.

Figure 2:
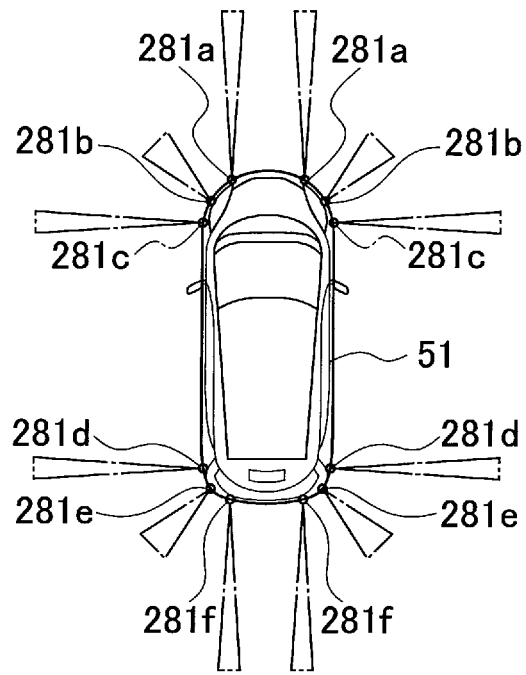
FIG. 2 is an explanatory diagram showing disposition and detection regions in the case in which sonars are adopted as distance sensors.

FIG. 2 is an explanatory diagram showing disposition and detection regions in the case in which sonars 281 (281a to 281f) are adopted as the distance sensors 28. The sonar 281 transmits ultrasound toward the periphery of the host vehicle 51 and detects a reflected wave of the ultrasound to thereby detect an object such as another vehicle present around the host vehicle 51, and further measures the distance to the detected object. As shown in FIG. 2, the sonars 281 include front sonars 281a that detect objects in the front of the host vehicle 51, front corner sonars 281b that detect objects on the left and right fronts of the host vehicle 51, front side sonars 281c that detect objects in the front sides of the host vehicle 51, rear side sonars 281d that detect objects in the rear sides of the host vehicle 51, rear corner sonars 281e that detect objects on the left and right rears of the host vehicle 51, and rear sonars 281f that detect objects in the rear of the host vehicle 51.

Figure 3:
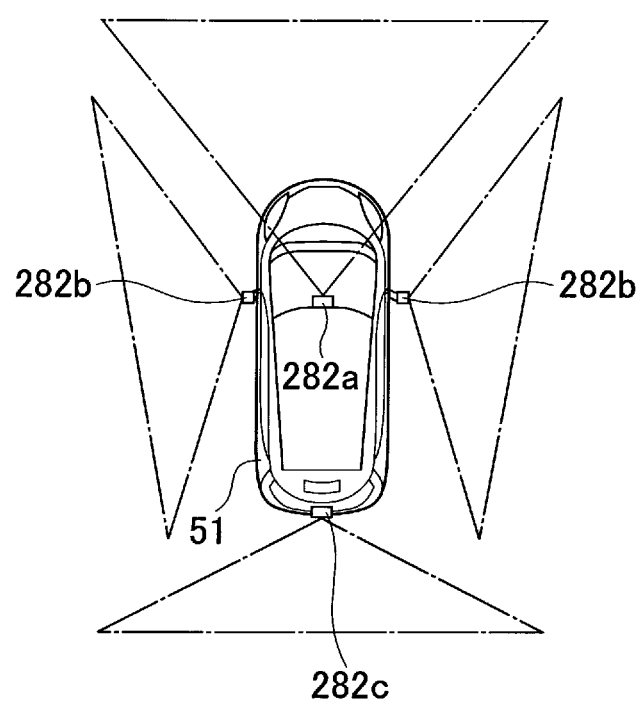
FIG. 3 is an explanatory diagram showing disposition and detection regions in the case in which cameras are adopted as the distance sensors.

FIG. 3 is an explanatory diagram showing disposition and detection regions in the case in which cameras 282 (282a to 282c) are adopted as another example of the distance sensors 28. As shown in FIG. 3, the cameras 282 include a front camera 282a that photographs the front of the host vehicle 51, side cameras 282b that photograph the sides of the host vehicle 51, and a rear camera 282c that photographs the rear of the host vehicle 51. By analyzing the images photographed by the cameras 282, objects present around the host vehicle 51 are detected and distances to the detected objects are measured. Around-view cameras can also be used as the cameras 282.

Figure 4:
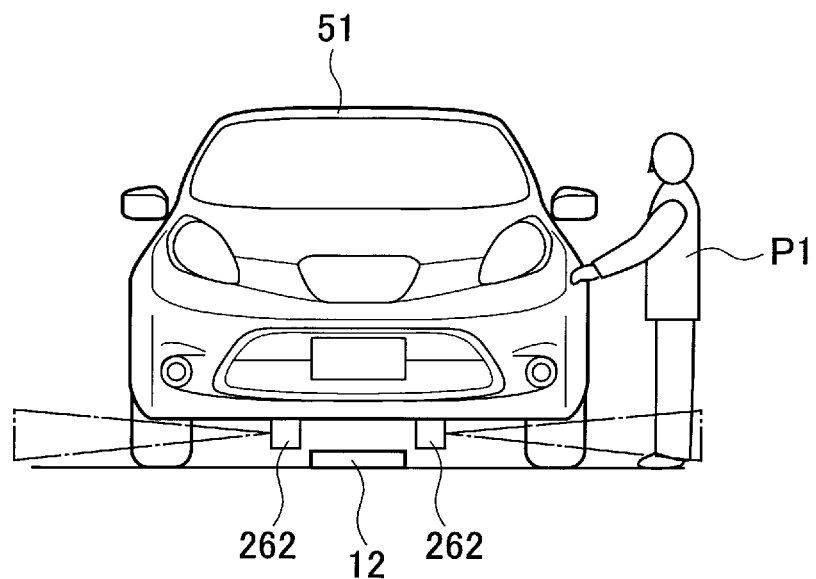
FIG. 4 is an explanatory diagram showing disposition and detection regions in the case in which Doppler sensors are adopted as moving object sensors.
Figure 5:
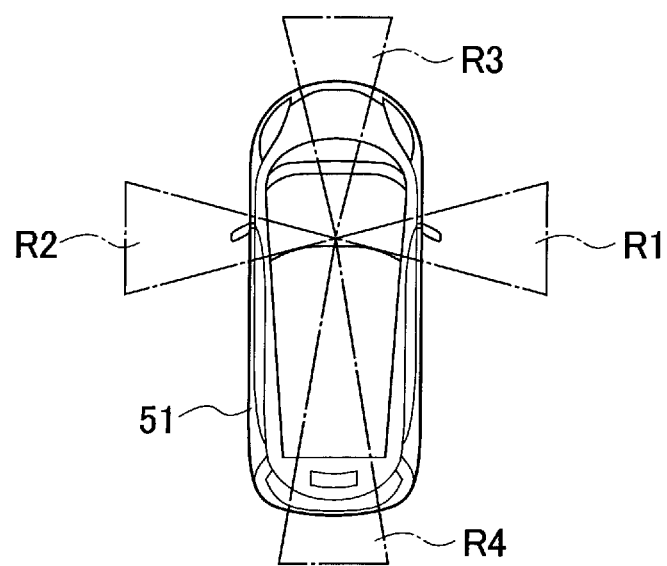
FIG. 5 is an explanatory diagram showing detection regions of the Doppler sensors.

FIG. 4 is an explanatory diagram showing disposition and detection regions in the case in which the Doppler sensors 262 are adopted as the moving object sensors 26. The Doppler sensors 262 are provided in the bottom of the host vehicle 51, for example. As shown in FIG. 5, the Doppler sensors 262 irradiate radio waves (microwaves) on a detection region R3 in the front of the host vehicle 51, detection regions R1 and R2 on the sides of the host vehicle 51, and a detection region R4 in the rear of the host vehicle 51 and detect reflected waves reflected on objects. The Doppler sensors 262 compare frequencies of the irradiated radio waves and frequencies of the radio waves reflected on the objects to thereby detect movements of the objects. When the objects are moving, frequencies of the reflected waves change according to the Doppler effect. Therefore, it is possible to detect whether the objects are moving or stand still.

Therefore, as shown in FIG. 4, it is possible to detect an occupant P1 (a moving object) who approaches the host vehicle 51 and operates a request button of a keyless entry system provided in a door. Note that, in FIG. 5, only the detection regions R1 to R4 of the Doppler sensors 262 are shown. Illustration of the Doppler sensors 262 is omitted.

Figure 6A:
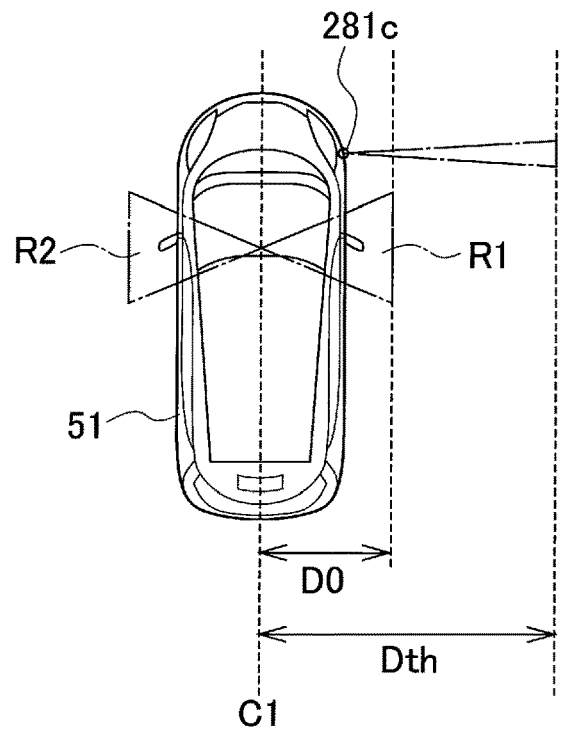
FIG. 6A is an explanatory diagram showing detection regions of the Doppler sensors in the case in which another vehicle is absent near a host vehicle.

The detection regions of the Doppler sensors 262 are changeable. In this embodiment, the detection region of the Doppler sensor 262 is changed according to the detection result by the sonar 281 (the distance sensor 28) shown in FIG. 2. Specifically, as shown in FIG. 6A, for example, when an object is not detected within a threshold distance Dth by the sonar 281c and it is determined that another vehicle adjacent to the host vehicle 51 is absent, the detection region of the Doppler sensor 262 is set to R1. As explained below, the detection region R1 is a range from a center line C1 of the host vehicle 51 to a distance D0.

Figure 6B:
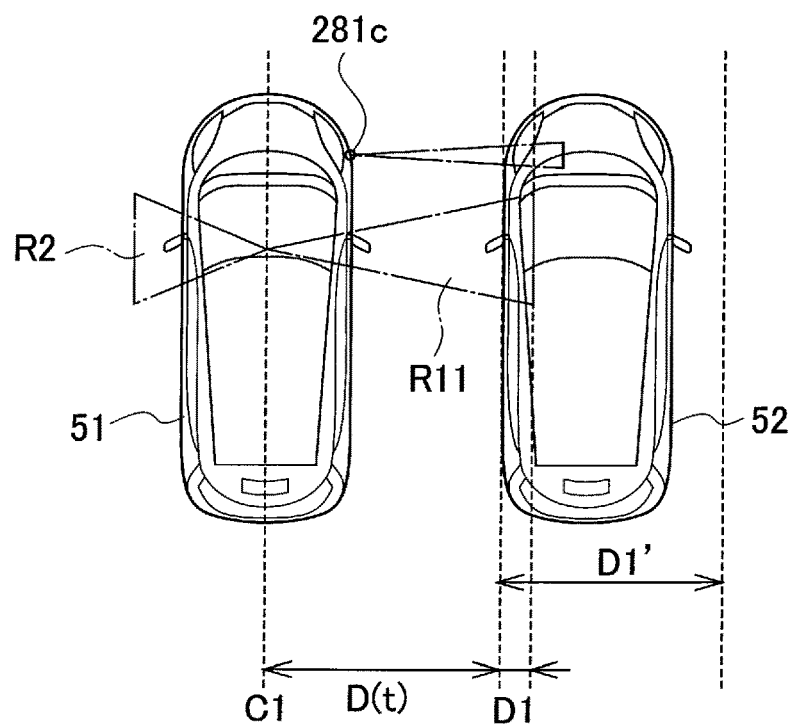
FIG. 6B is an explanatory diagram showing detection regions of the Doppler sensors in the case in which another vehicle is present near the host vehicle.

On the other hand, when another vehicle 52 is present, as shown in FIG. 6B, the detection region of the Doppler sensor 262 is set to R11 expanded outward as compared to R1. As explained below, the detection region R11 is a range from the center line C1 of the host vehicle 51 to a distance "D(t)+D1" (>D0). That is, when the other vehicle 52 adjacent to the host vehicle 51 is present, the detection region of the Doppler sensor 262 is set wide such that a farther moving object can be detected.

Therefore, when an occupant of the other vehicle 52 approaches the other vehicle 52 in order to operate a request button provided in a door, it is possible to detect the occupant.

Cameras can be used as another example of the moving object sensors 26. By photographing the periphery of the host vehicle 51 with the cameras and analyzing photographed images, it is possible to detect a moving object present around the host vehicle 51.

Explanation of a Processing Procedure in the First Embodiment

Figure 7:
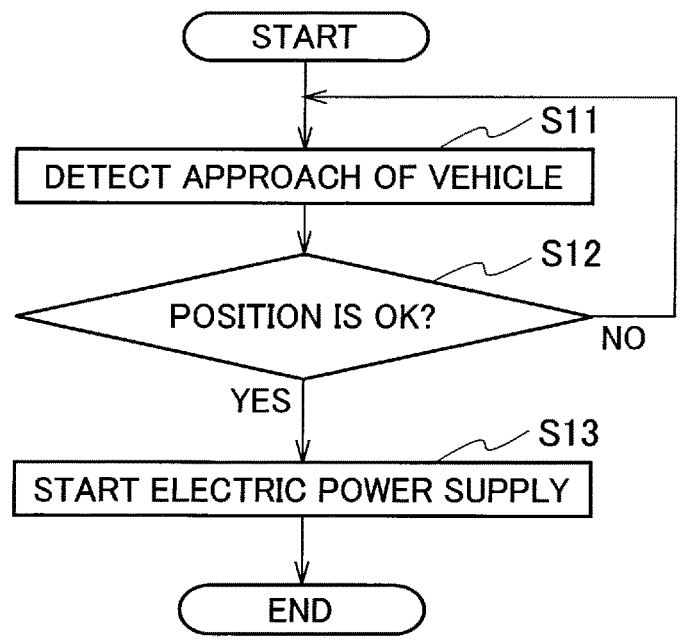
FIG. 7 is a flowchart relating to a first embodiment of the present invention and showing a procedure in which the host vehicle is stopped in an electric power suppliable position of a parking space and starts electric power supply.
Figure 8:
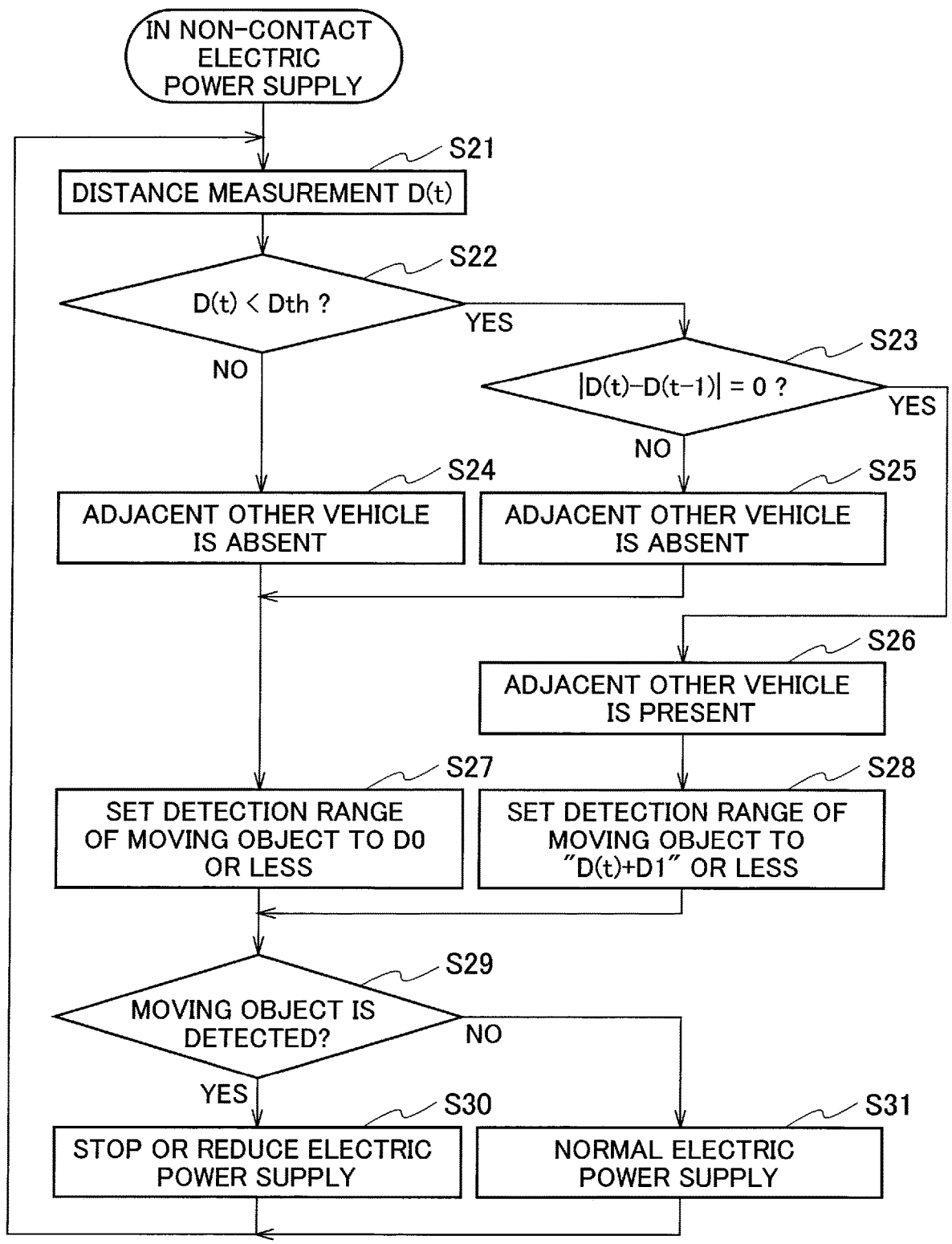
FIG. 8 is a flowchart showing processing of the non-contact electric power supply system according to the first embodiment of the present invention.

Action of the non-contact electric power supply system according to the first embodiment configured as explained above will be explained with reference to flowcharts in FIG. 7 and FIG. 8. FIG. 7 shows a processing procedure for determining whether the host vehicle 51 is stopped in the electric power suppliable position of the parking space 2 and starting electric power supply.

First, in step S11, the ground controller 11 detects the host vehicle 51 approaching the parking space 2. In step S12, the ground controller 11 determines, with a position detection sensor (not shown in the figure) that detects the position of the host vehicle 51, whether the host vehicle 51 approaching the parking space 2 is stopped in the electric power suppliable position. The ground controller 11 determines that the host vehicle 51 is in the electric power suppliable position when the host vehicle 51 reaches a position where the electric power receiving coil 22 is opposed to the electric power transmitting coil 12 shown in FIG. 1, or a position within a predetermined range from the opposed position.

When determining that the host vehicle 51 is stopped in the electric power suppliable position, in step S13, the ground controller 11 supplies electric power to the electric power transmitting coil 12 and starts charging the battery 27. That is, the ground controller 11 supplies electric power to the electric power transmitting coil 12 to energize the electric power transmitting coil 12 and transmits electric power to the electric power receiving coil 22 in a non-contact manner. The electric power received by the electric power receiving coil 22 is rectified by the rectifying unit 25 and thereafter charged in the battery 27.

In this embodiment, when non-contact electric power supply is performed between the electric power transmitting coil 12 and the electric power receiving coil 22 and a moving object such as a pedestrian is detected near the host vehicle 51, processing for stopping or reducing electric power supply to the electric power transmitting coil 12 is carried out.

In the following explanation, a processing procedure during non-contact electric power supply will be explained with reference to a flowchart in FIG. 8. First, in step S21, the vehicle controller 24 actuates the sonars 281 (the distance sensors 28) and determines whether an object is present around the host vehicle 51, based on detection data of the sonars 281. Further, when an object is present, the vehicle controller 24 measures a distance D(t) to the object. Note that "t" indicates time of distance detection. The distance D(t) is a distance with respect to the center line (C1 shown in FIG. 6A) of the host vehicle 51.

In step S22, the vehicle controller 24 determines whether the distance D(t) is smaller than a preset threshold distance Dth. The threshold distance Dth can be set based on a distance to another vehicle parked adjacent to the host vehicle 51.

When "D(t)≥Dth" (NO in step S22), in step S24, the vehicle controller 24 determines that another vehicle adjacent to the host vehicle 51 is absent.

When "D(t)<Dth" (YES in step S22), in step S23, the vehicle controller 24 calculates a difference between a distance D(t−1) detected last time and a distance D(t) detected this time. Further, the vehicle controller 24 determines whether the calculated difference is zero.

When the difference is not zero (NO in step S23), the object detected by the sonars 281 is moving. In step S25, the vehicle controller 24 determines that another vehicle is absent.

On the other hand, when the difference is zero (YES in step S23), since the object detected by the sonars 281 is stopped, in step S26, the vehicle controller 24 determines that the other vehicle 52 adjacent to the host vehicle 51 is present.

When determining in step S24 or S25 that another vehicle is absent, in step S27, as shown in FIG. 6A, the vehicle controller 24 sets the detection region on a side of the Doppler sensor 262 to the region R1 to the distance D0 (hereinafter referred to as "normal detection distance D0") from the center line C1. The normal detection distance D0 is desirably set to a distance in which an occupant of the host vehicle 51 approaches the host vehicle 51 in order to press a request button for locking and unlocking. The normal detection distance D0 is 5 m, for example. As a result, as shown in FIG. 4, it is possible to detect the occupant P1.

Figure 6C:
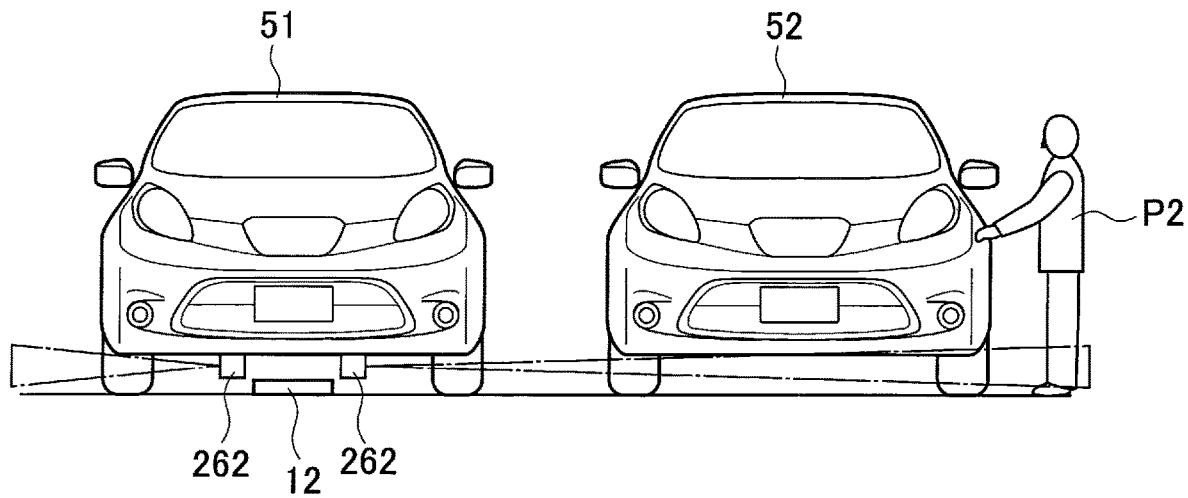
FIG. 6C is an explanatory diagram showing detection regions of the Doppler sensors in the case in which another vehicle is absent near a host vehicle.

When determining in step S26 that the adjacent other vehicle 52 is present, in step S28, as shown in FIG. 6B, the vehicle controller 24 sets the detection region on the side of the Doppler sensor 262 to the region R11 to the distance "D(t)+D1" from the center line C1. "D1" is an expansion distance. As a result, since the occupant who approaches the other vehicle 52 and operates the request button near the door is included in the detection region of the Doppler sensor 262, it is possible to detect the occupant of the other vehicle 52. As shown in FIG. 6B, it is also possible to set the expansion distance to "D1'" larger than the vehicle width of the other vehicle 52. By setting the expansion distance in this way, the detection region of the Doppler sensor 262 is set to a region to a distance "D(t)+D1'" from the center line C1. As a result, as shown in FIG. 6C, it is possible to detect an occupant P2 of the other vehicle 52 who approaches the host vehicle 51 from the opposite side (in the figure, the right side). It is possible to detect a moving object with a higher accuracy.

In step S29, the vehicle controller 24 determines whether a moving object is detected by the Doppler sensors 262. When a moving object is detected (YES in step S29), in step S30, the vehicle controller 24 outputs, from the wireless communication unit 23 to the ground controller 11 of the electric power supply device 100, a command signal for stopping or reducing electric power supply. Consequently, the ground controller 11 stops or reduces the electric power supply to the electric power transmitting coil 12. That is, when the keyless entry system is operated in the host vehicle 51 or the other vehicle 52 adjacent to the host vehicle 51, it is possible to prevent the operation of the keyless entry system from affecting wireless communication.

On the other hand, when determining in the processing in step S29 that a moving object is not detected, in step S31, the vehicle controller 24 sets the electric power supply to the electric power transmitting coil 12 to electric power supply at normal time.

Explanation of Effects of the First Embodiment

In this way, the non-contact electric power supply system according to the first embodiment determines, with the sonars 281 (the distance sensors 28), whether the other vehicle 52 adjacent to the host vehicle 51 is present. When another vehicle is absent as shown in FIG. 6A, the non-contact electric power supply system sets the detection region of the Doppler sensor 262 (the moving object sensor 26) to R1. Therefore, since only an occupant approaching the host vehicle 51 is detected and, when the occupant is detected, the electric power supply is stopped or reduced. Therefore, it is possible to avoid a situation in which an electromagnetic wave generated during the non-contact electric power supply affects the wireless communication of the keyless entry system of the host vehicle 51. Further, since the detection region is not expanded more than necessary, it is possible to prevent malfunction of detecting a pedestrian passing near the host vehicle 51 and stopping or reducing electric power supply.

As shown in FIG. 6B, when the other vehicle 52 adjacent to the host vehicle 51 is present, the non-contact electric power supply system expands the detection region of the Doppler sensor 262 from R1 to R11. That is, when determining that the other vehicle 52 is parked, the non-contact electric power supply system expands the detection region as compared to when not determining that the other vehicle 52 is parked. Therefore, the non-contact electric power supply system detects an occupant approaching the host vehicle 51 and the other vehicle 52, and when the occupant is detected, the non-contact electric power supply system stops or reduces the electric power supply. Therefore, it is possible to avoid a situation in which an electromagnetic wave generated during the non-contact electric power supply affects the wireless communication of the keyless entry systems of the host vehicle 51 and the other vehicle 52.

Since the Doppler sensors 262 (the moving object sensors 26) are mounted on the host vehicle 51, the host vehicle 51 can detect the other vehicle 52. It is possible to perform highly accurate detection of a moving object.

Further, since the detection region R11 is set to the distance obtained by adding the expansion distance D1 to the distance D(t) to the other vehicle 52, it is possible to ensure detection of an occupant approaching the other vehicle 52.

In the keyless entry system, an occupant carrying a portable machine approaches a host vehicle and presses a request button provided near a doorknob, whereby a signal (LF) having a frequency of several kilohertz is emitted from the host vehicle. When receiving the signal, the portable machine outputs a signal (UHF) having a frequency of several gigahertz and locks or unlocks the door. It is likely that such a keyless entry system is affected by an electromagnetic wave generated during non-contact electric power supply and causes malfunction. In this embodiment, when presence of an occupant (a moving object) who locks or unlocks a vehicle door is detected, electric power supply is stopped or reduced. Therefore, it is possible to avoid a situation in which the electromagnetic wave generated during the non-contact electric power supply affects the wireless communication of the keyless entry system.

Explanation of a Modification of the First Embodiment

Figure 9:
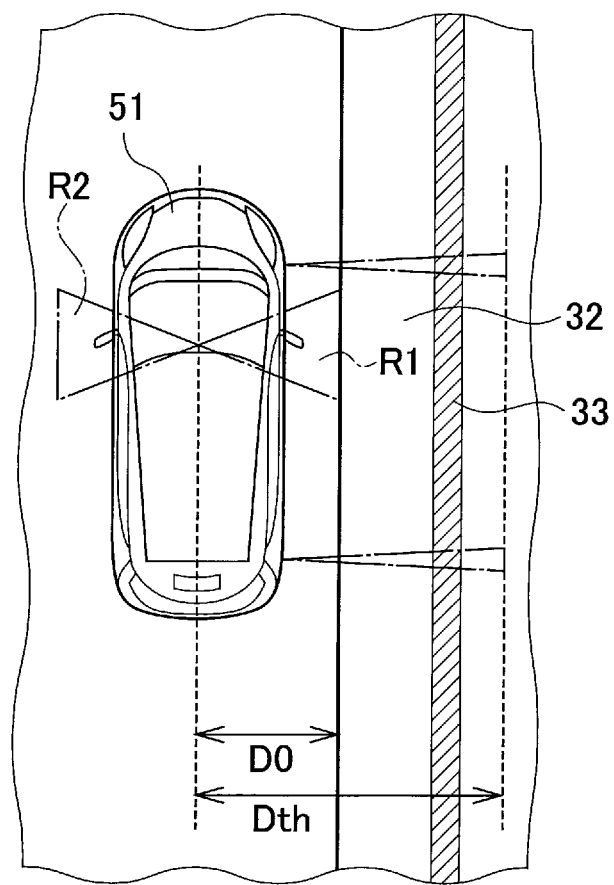
FIG. 9 is an explanatory diagram showing a modification of the first embodiment.

In the first embodiment explained above, the detection region of the Doppler sensor 262 is changed according to presence or absence of the other vehicle 52 adjacent to the host vehicle 51. However, as shown in FIG. 9, in some cases, a sidewalk 32 is present on a side of a parking space where the host vehicle 51 carries out the non-contact electric power supply and a wall 33 is present on a side of the sidewalk 32. In such a case, since the wall 33 is present on the inner side of the threshold distance Dth, the wall 33 is detected by the sonars 281. It is erroneously recognized that another vehicle is parked on the side of the host vehicle 51. The detection region of the Doppler sensor 262 is set to expand to the vicinity of the wall 33. A pedestrian walking on the sidewalk 32 is detected as a moving object. Therefore, it is likely that malfunction of stopping or reducing electric power supply occurs.

In a modification, an invalidation switch (not shown in the figure) for invalidating detection by the Doppler sensors 262 is provided. When the invalidation switch is operated, detection of a moving object is not performed and the detection regions of the Doppler sensors 262 is not changed. That is, the detection regions of the Doppler sensors 262 is maintained in R1 shown in FIG. 6A. Consequently, it is possible to prevent occurrence of malfunction.

Explanation of a Second Embodiment

Figure 10:
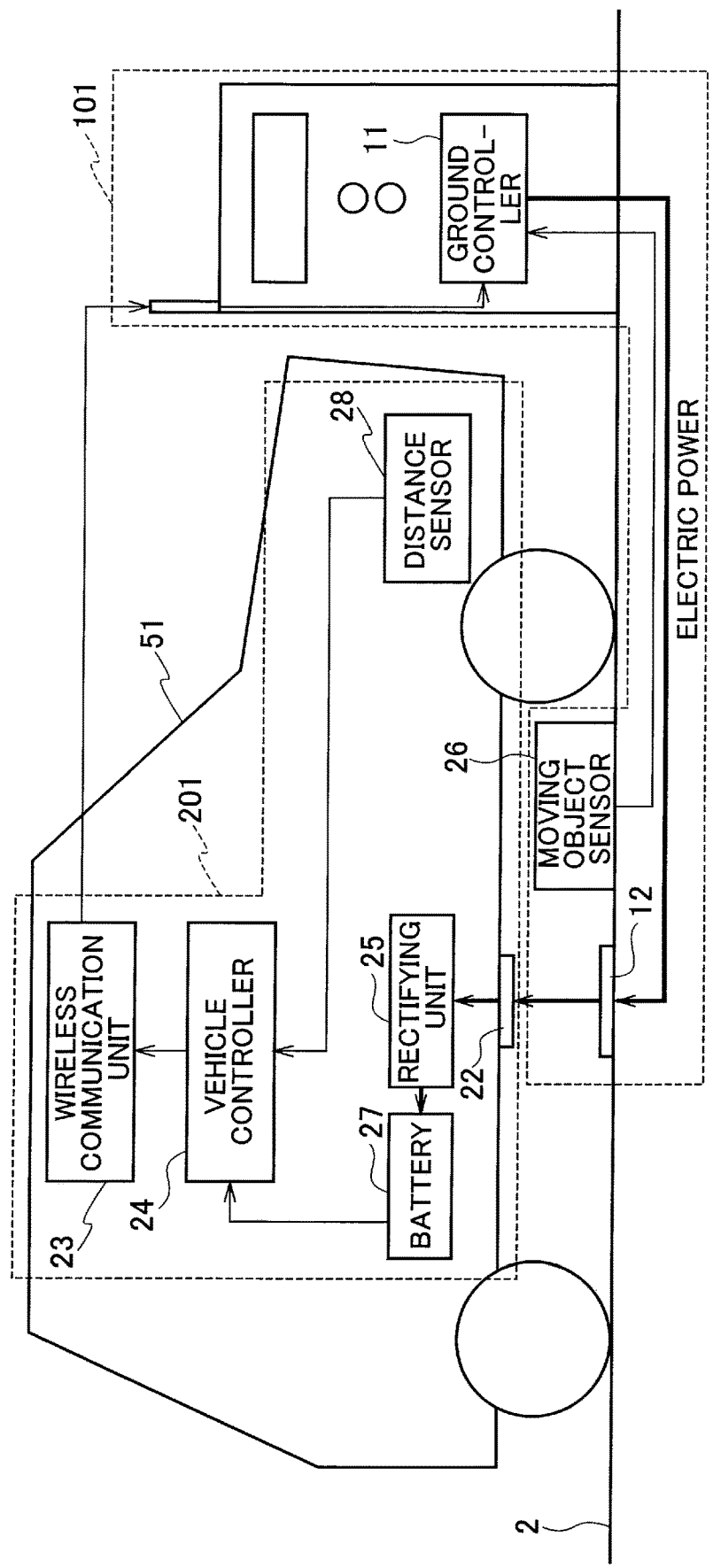
FIG. 10 is a block diagram showing the configuration of a non-contact electric power supply system according to a second embodiment of the present invention.
Figure 11:
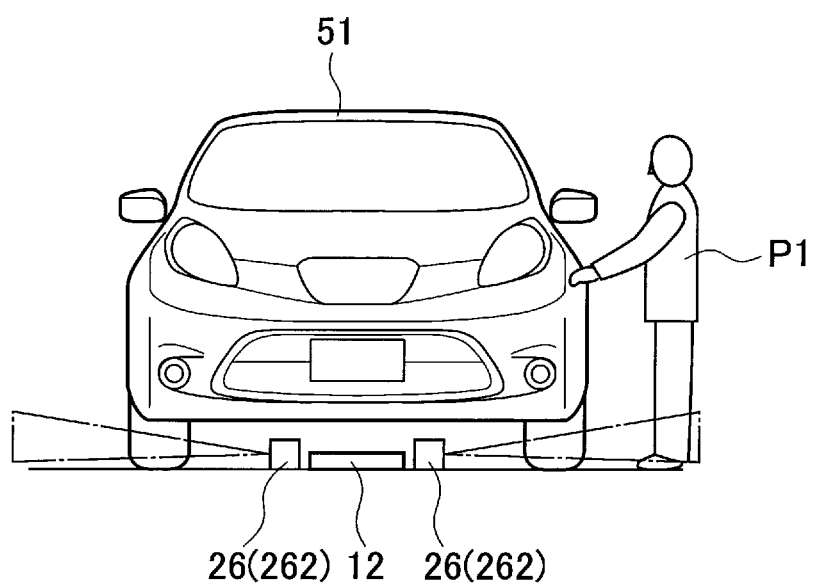
FIG. 11 is an explanatory diagram showing Doppler sensors set on the ground side and their detection regions.

A second embodiment of the present invention will be explained. FIG. 10 is a block diagram showing the configuration of a non-contact electric power supply system according to the second embodiment. As shown in FIG. 10, the second embodiment is different from the first embodiment in that the moving object sensor 26 is provided in an electric power supply device 101 and the moving object sensor 26 is not provided in an electric power receiving device 201. That is, as shown in FIG. 11, the Doppler sensors 262 (the moving object sensors 26) are provided near the electric power transmitting coil 12 to detect a moving object approaching the host vehicle 51. The other components are the same as the components in the first embodiment explained above. As in the first embodiment, besides the Doppler sensors 262, cameras can be used as the moving object sensors 26.

In the second embodiment, when an object present around the host vehicle 51 is detected and a distance to the object is further detected by the distance sensor 28, this distance data is transmitted from the wireless communication unit 23 to the ground controller 11. The ground controller 11 determines, based on the distance to the object, whether the other vehicle 52 adjacent to the host vehicle 51 is present. Further, when the other vehicle 52 is present, the ground controller 11 changes the detection region of the Doppler sensor 262.

Specifically, as in the first embodiment explained above, when determining based on a detection result of the distance sensor 28 that the other vehicle 52 adjacent to the host vehicle 51 is absent, the ground controller 11 sets the detection region of the Doppler sensor 262 to the region R1 as shown in FIG. 6A. On the other hand, when determining that the other vehicle 52 is present, the ground controller 11 expands the detection region of the Doppler sensor 262 and sets the detection region to R11 as shown in FIG. 6B.

Consequently, as in the first embodiment explained above, it is possible to avoid a situation in which the electromagnetic wave generated during the non-contact electric power supply affects the wireless communication of the keyless entry system of the host vehicle 51 or the other vehicle 52. Since the Doppler sensors 262 are set on the ground, it is unnecessary to set the Doppler sensors 262 on the vehicle side. It is possible to reduce components mounted on the vehicle.

Explanation of a Third Embodiment

A third embodiment of the present invention will be explained. The third embodiment is different from the first embodiment in that a moving object is detected and electric power supply is stopped or reduced and, thereafter, when the moving object is not detected, the electric power supply is returned to normal electric power supply after elapse of a predetermined interruption time rather than being immediately returned to the normal electric power supply. Since the configuration of a system is the same as the configuration shown in FIG. 1 explained in the first embodiment, explanation of the configuration is omitted.

Figure 12:
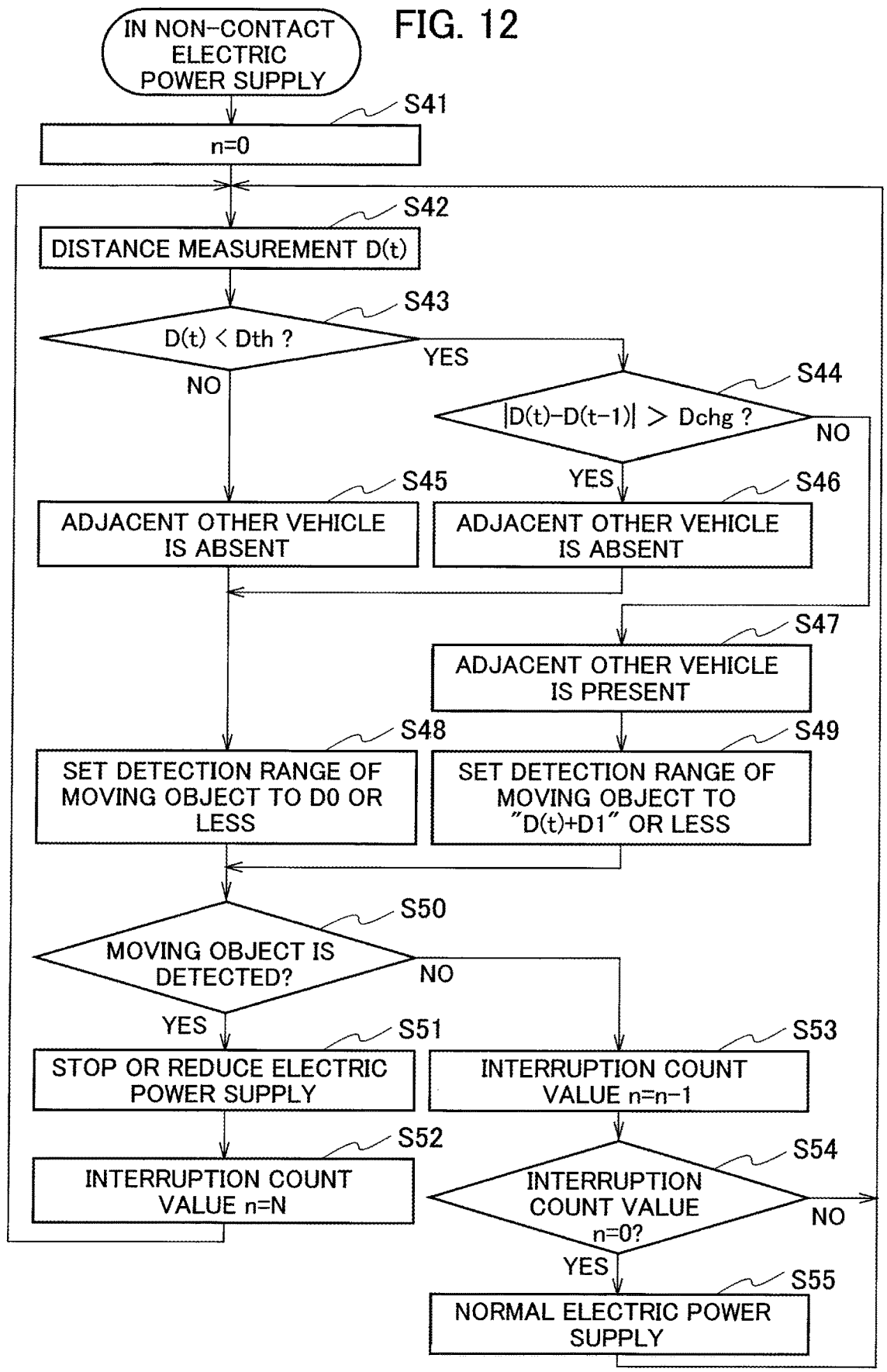
FIG. 12 is a flowchart showing processing of a non-contact electric power supply system according to a third embodiment of the present invention.

In the following explanation, a processing procedure of a non-contact electric power supply system according to the third embodiment will be explained with reference to a flowchart in FIG. 12. First, in step S41, the vehicle controller 24 sets an interruption count value n explained below to "0".

Subsequently, in step S42, the vehicle controller 24 determines, based on detection data of the sonars 281 (the distance sensors 28), whether an object is present around the host vehicle 51. When an object is present, the vehicle controller 24 further measures the distance D(t) to the object. Note that "t" indicates time of distance detection.

In step S43, the vehicle controller 24 determines whether the distance D(t) is smaller than the preset threshold distance Dth. The threshold distance Dth can be set based on a distance to another vehicle parked adjacent to the host vehicle 51.

When "D(t)≥Dth" (NO in step S43), since an object is absent within the distance Dth from the host vehicle 51, in step S45, the vehicle controller 24 determines that another vehicle adjacent to the host vehicle 51 is absent.

When "D(t)<Dth" (YES in step S43), in step S44, the vehicle controller 24 calculates a difference between the distance D(t−1) at the last detection time and the distance D(t) at this detection time and determines whether the difference exceeds a change determination threshold Dchg.

When the difference exceeds the change determination threshold Dchg (YES in step S44), since the object detected by the sonars 281 is moving and is not a vehicle parked near the host vehicle 51, in step S46, the vehicle controller 24 determines that another vehicle adjacent to the host vehicle 51 is absent.

On the other hand, when the difference does not exceed the change determination threshold Dchg (NO in step S44), the object is stopped. In step S47, the vehicle controller 24 determines that another vehicle adjacent to the host vehicle 51 is present.

When determining in step S45 or S46 that another vehicle is absent, in step S48, the vehicle controller 24 sets the detection regions of the Doppler sensors 262 (the moving object sensors 26) to the detection regions R1 (see FIG. 6A) within the normal detection distance D0.

When determining in step S47 that another vehicle is present, in step S49, the vehicle controller 24 sets the detection region of the Doppler sensor 262 to the detection region R11 (see FIG. 6B) within "D(t)+D1". "D1" is the expansion distance as shown in FIG. 6B.

In step S50, the vehicle controller 24 determines whether a moving object (a pedestrian or the like) is detected by the Doppler sensors 262. When a moving object is detected (YES in step S50), in step S51, the vehicle controller 24 outputs, from the wireless communication unit 23 to the ground controller 11, a command signal for stopping or reducing electric power supply. Consequently, the electric power supply to the electric power transmitting coil 12 is stopped or reduced, and generation of an electromagnetic wave is suppressed. Therefore, it is possible to avoid influence on the wireless communication of the keyless entry system. Thereafter, in step S52, the vehicle controller 24 sets the interruption count value n explained above to "n=N".

On the other hand, when a moving object is not detected in the processing in step S50, in step S53, the vehicle controller 24 subtracts "1" from the interruption count value n. Specifically, the vehicle controller 24 sets "n=n−1". However, when n=0, the vehicle controller 24 maintains n=0.

In step S54, the vehicle controller 24 determines whether the interruption count value n is equal to 0. When n is not equal to 0 (NO in step S54), the vehicle controller 24 returns the processing to step S42. On the other hand, when n is equal to 0 (YES in step S54), in step S55, the vehicle controller 24 returns the electric power supply to the electric power transmitting coil 12 to the normal electric power supply. That is, when the electric power supply has been stopped or reduced, the vehicle controller 24 returns the electric power supply to the normal electric power supply. Thereafter, the vehicle controller 24 returns the processing to step S42.

In this way, in the non-contact electric power supply system according to the third embodiment, when a moving object such as a pedestrian is present near the host vehicle 51 or the other vehicle 52, by stopping or reducing the electric power supply to the electric power transmitting coil 12, it is possible to reduce influence on the wireless communication of the keyless entry system. Further, thereafter, when the presence of the moving object is not detected, for example, when the occupant of the host vehicle 51 moves away from the host vehicle 51 and moves farther than the detection distance by the Doppler sensors 262, the electric power supply to the electric power transmitting coil 12 is not immediately returned to the electric power supply at the normal time. A state in which the electric power supply is stopped or reduced is continued until the interruption count value N decreases to zero. Therefore, it is possible to avoid transmission electric power being frequently changed.

Explanation of a Fourth Embodiment

A fourth embodiment of the present invention will be explained. In the fourth embodiment, it is determined, based on detection data of the front side sonar 281c (see FIG. 2) mounted on the host vehicle 51 and detection data of the rear side sonar 281d mounted on the host vehicle 51, whether the other vehicle 52 adjacent to the host vehicle 51 is parked in parallel to the host vehicle 51. The detection regions of the Doppler sensors 262 (the moving object sensors 26) are changed based on a result of the determination. A system configuration is the same as the system configuration shown in FIG. 1 explained above. Therefore, explanation of the system configuration is omitted.

Figure 13:
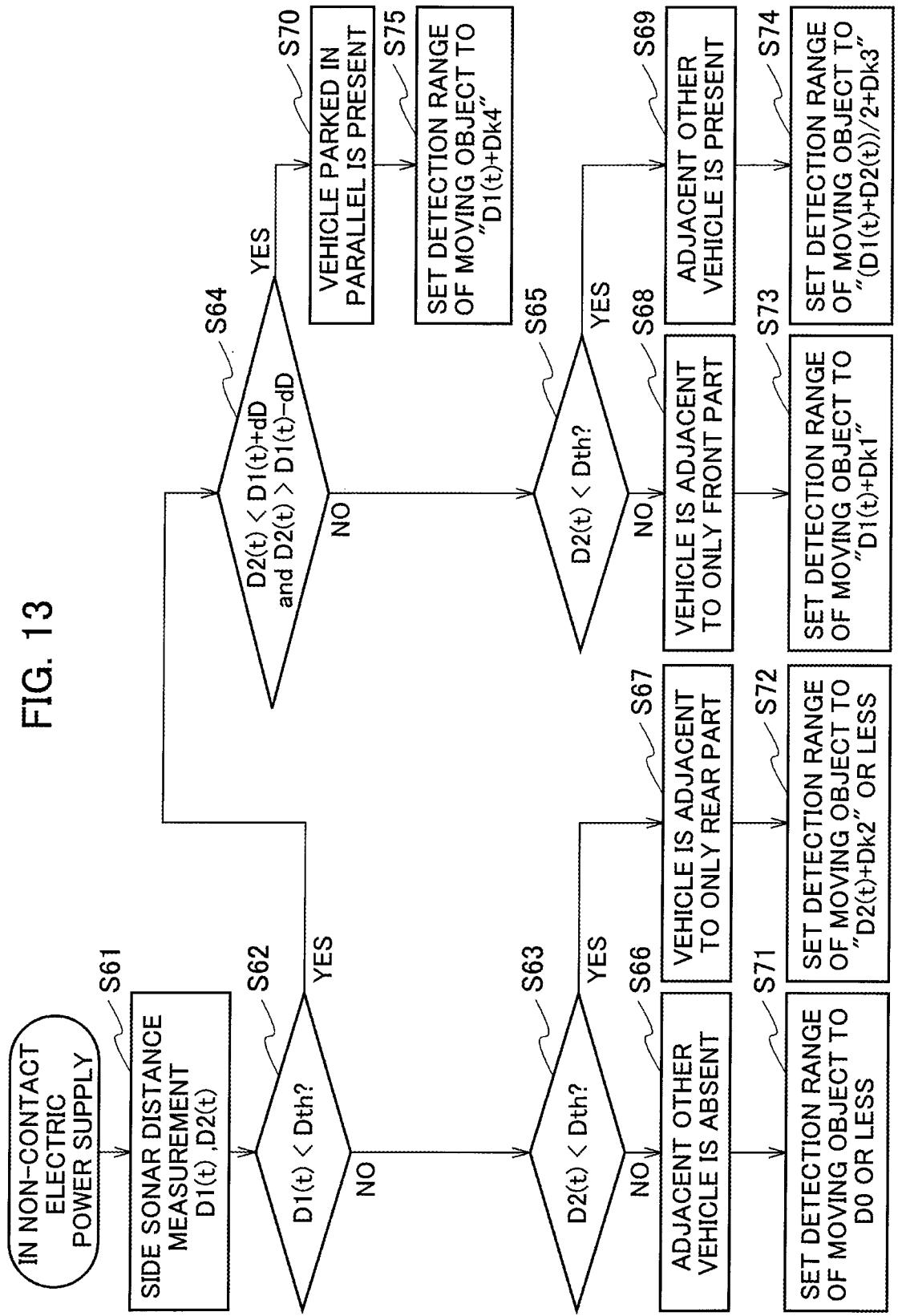
FIG. 13 is a flowchart showing processing of a non-contact electric power supply system according to a fourth embodiment of the present invention.

Action of a non-contact electric power supply system according to the fourth embodiment will be explained with reference to a flowchart in FIG. 13. FIG. 13 shows processing until the detection region of the Doppler sensor 262 is set.

First, in step S61, distance detection by the front side sonar 281c and the rear side sonar 281d shown in FIG. 2 is performed. When an object is present on a side of the host vehicle 51, a distance D1(t) is detected by the front side sonar 281c and a distance D2(t) is detected by the rear side sonar 281d.

In step S62, the vehicle controller 24 determines whether the distance D1(t) is smaller than the threshold distance Dth. That is, the vehicle controller 24 determines whether an object is present in a region up to the threshold distance Dth forward on the side of the host vehicle 51. When an object is absent, the vehicle controller 24 advances the processing to step S63. When an object is present, the vehicle controller 24 advances the processing to step S64.

In step S63, the vehicle controller 24 determines whether the distance D2(t) is smaller than the threshold distance Dth. That is, the vehicle controller 24 determines whether an object is present in a region up to the threshold distance Dth rearward on the side of the host vehicle 51. When an object is absent, the vehicle controller 24 advances the processing to step S66. When an object is present, the vehicle controller 24 advances the processing to step S67.

Figure 14A:
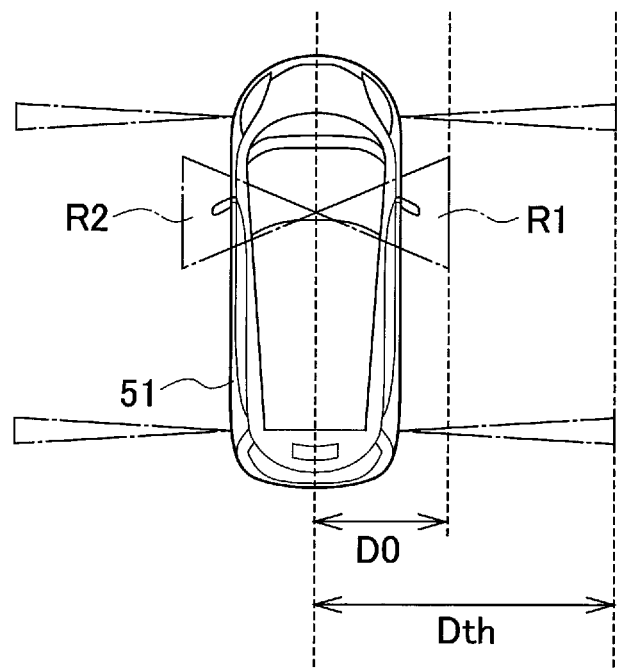
FIG. 14A is an explanatory diagram showing detection regions of the Doppler sensors in the case in which another vehicle is not parked on a side of a host vehicle.

In step S66, the vehicle controller 24 determines that another vehicle adjacent to the host vehicle 51 is absent. That is, when an object is not detected by the front side sonar 281c within the threshold distance Dth and an object is not detected by the rear side sonar 281d within the threshold distance Dth, this means that an object is absent near the host vehicle 51 as shown in FIG. 14A. Therefore, the vehicle controller 24 determines that another vehicle is absent. Thereafter, in step S71, the vehicle controller 24 sets the detection regions of the Doppler sensors 262 to the detection regions R1 within the normal detection distance D0.

Figure 14B:
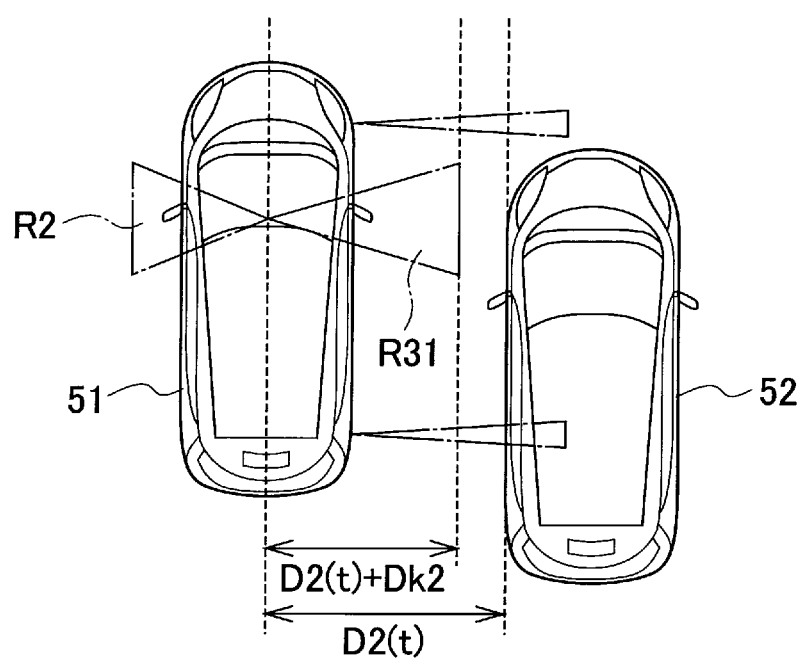
FIG. 14B is an explanatory diagram showing detection regions of the Doppler sensors in the case in which another vehicle is parked rearward on the side of the host vehicle.

In step S67, the vehicle controller 24 determines that the other vehicle 52 adjacent to only a rear part of the host vehicle 51 is present. That is, when an object is not detected by the front side sonar 281c within the threshold distance Dth and an object is detected by the rear side sonar 281d within the threshold distance Dth, the vehicle controller 24 determines that the other vehicle 52 is present rearward on the side of the host vehicle 51 as shown in FIG. 14B. Thereafter, in step S72, the vehicle controller 24 sets the detection region of the Doppler sensor 262 to a detection region R31 at "D2(t)+Dk2" or less. "Dk2" is an expansion distance and is a negative value.

On the other hand, in step S64, the vehicle controller 24 determines whether "D2(t)<D1(t)+dD" and "D2(t)>D1(t)−dD". "dD" is a very small distance for determining whether the other vehicle 52 is parked in parallel to the host vehicle 51. That is, the vehicle controller 24 determines YES when the other vehicle 52 is parked substantially in parallel to the host vehicle 51. Otherwise, the vehicle controller 24 determines NO.

When determining NO in step S64, in step S65, the vehicle controller 24 determines whether the distance D2(t) is smaller than the threshold distance Dth. That is, the vehicle controller 24 determines whether an object is present within the threshold distance Dth rearward on the side of the host vehicle 51. When an object is absent, the vehicle controller 24 advances the processing to step S68. When an object is present, the vehicle controller 24 advances the processing to step S69.

Figure 14C:
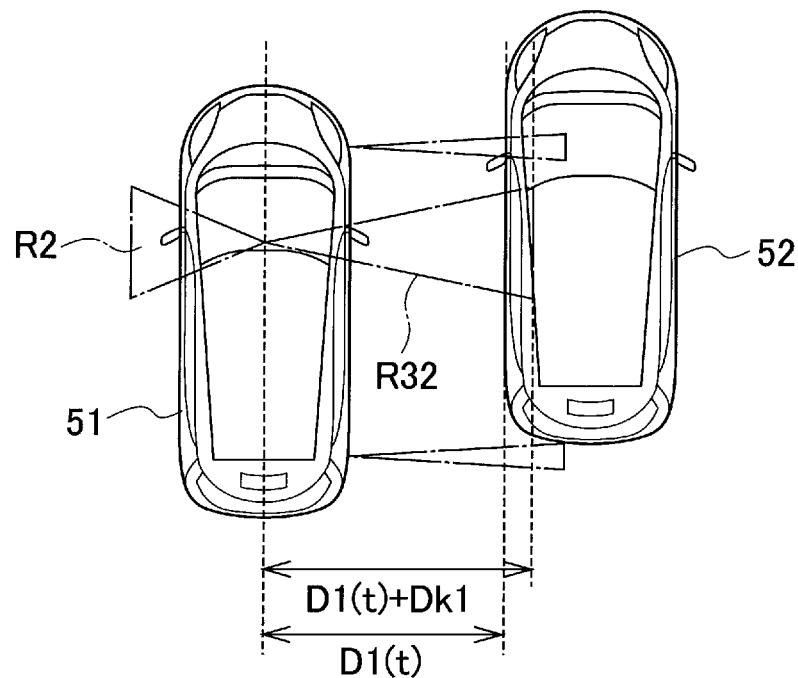
FIG. 14C is an explanatory diagram showing detection regions of the Doppler sensors in the case in which another vehicle is parked forward on the side of the host vehicle.

In step S68, the vehicle controller 24 determines whether the other vehicle 52 adjacent to only a front part of the host vehicle 51 is present. That is, when an object is detected within the threshold distance Dth by the front side sonar 281c and an object is not detected within the threshold distance Dth by the rear side sonar 281d, the vehicle controller 24 determines that the other vehicle 52 is present forward on the side of the host vehicle 51 as shown in FIG. 14C. Thereafter, in step S73, the vehicle controller 24 sets the detection region of the Doppler sensor 262 to a detection region R32 equal to or smaller than "D1(t)+Dk1". "Dk1" is an expansion distance.

That is, a region up to a distance obtained by adding the expansion distance Dk1 to the distance D1(t) from the host vehicle 51 to the other vehicle 52 is set as the detection region R32, when the occupant of the other vehicle 52 approaches the other vehicle 52, it is possible to surely detect the occupant with the Doppler sensor 262. It is possible to prevent the detection region from being expanded more than necessary.

In step S69, the vehicle controller 24 determines that the other vehicle 52 adjacent to the host vehicle 51 is present. In this case, since a difference between the distance D1(t) and the distance D2(t) is large (larger than "dD" described above), as shown in FIG. 14D, the other vehicle 52 is parked obliquely to the host vehicle 51. Thereafter, in step S74, the vehicle controller 24 sets the detection region of the Doppler sensor 262 to a detection region R33 equal to or smaller than "(D1(t)+D2(t))/2+Dk3". "Dk3" is an expansion distance.

That is, the vehicle controller 24 calculates an average of the distance D1(t) and the distance D2(t) and sets a region up to a distance obtained by adding the expansion distance Dk3 to the average as the detection region R33. Therefore, when the occupant of the other vehicle 52 approaches the other vehicle 52, it is possible to surely detect the occupant with the Doppler sensor 262. It is possible to prevent the detection region from being expanded more than necessary.

Figure 14D:
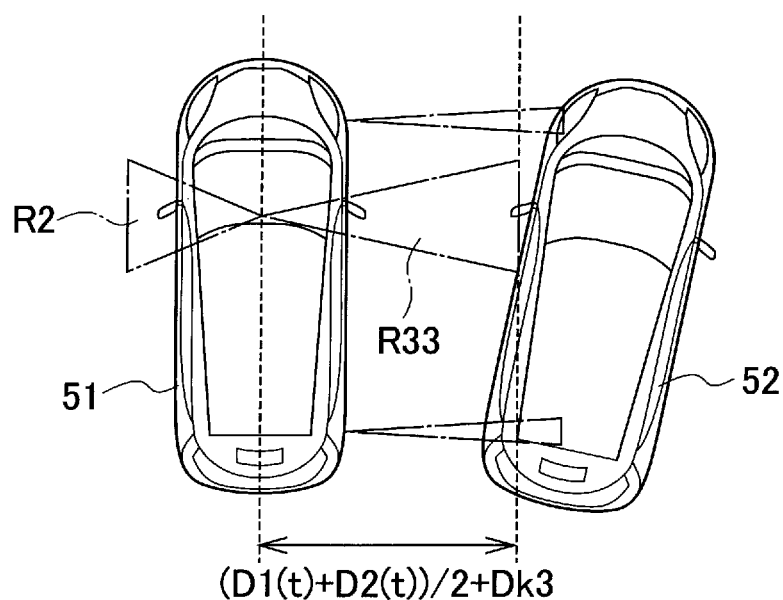
FIG. 14D is an explanatory diagram showing detection regions of the Doppler sensors in the case in which another vehicle is obliquely parked on the side of the host vehicle.
Figure 14E:
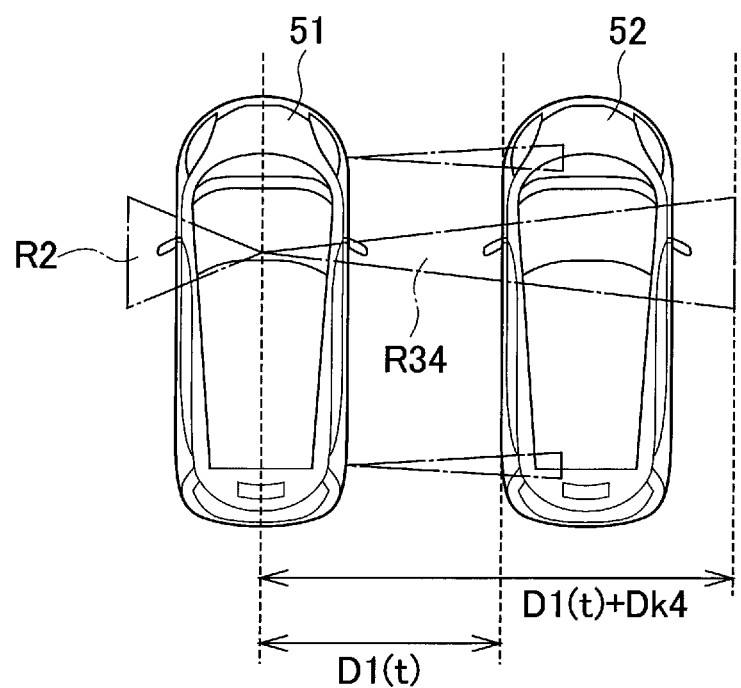
FIG. 14E is an explanatory diagram showing detection regions of the Doppler sensors in the case in which another vehicle is parked on the side of and in parallel to the host vehicle.

On the other hand, when determining YES in step S64, in step S70, the vehicle controller 24 determines that the other vehicle 52 is present adjacent in parallel to the host vehicle 51 as shown in FIG. 14E. Thereafter, in step S75, the vehicle controller 24 sets the detection region of the Doppler sensor 262 to a detection region R34 equal to or smaller than "D1(t)+Dk4". "Dk4" is an expansion distance.

That is, a region up to a distance obtained by adding the expansion distance Dk4 to the distance D1(t) from the host vehicle 51 to the other vehicle 52 is set as the detection region R34. Therefore, when the occupant of the other vehicle 52 approaches the other vehicle 52, it is possible to surely detect the occupant with the Doppler sensor 262.

Thereafter, as in the first embodiment explained above, when a moving object (a pedestrian or the like) is detected in the detection regions of the Doppler sensors 262 set as appropriate by the method explained above, the electric power supply to the electric power transmitting coil 12 is stopped or reduced. In this way, it is possible to reduce generation of an electromagnetic wave and avoid the electromagnetic wave affecting the wireless communication of the keyless entry system.

In this way, in the non-contact electric power supply system according to the fourth embodiment, when the other vehicle 52 adjacent to the host vehicle 51 is present, the detection regions of the Doppler sensors 262 are changed according to a stop state of the other vehicle 52. Specifically, the detection regions of the Doppler sensors 262 are set as appropriate respectively when the other vehicle 52 is present in the rear of the host vehicle 51 as shown in FIG. 14B, when the other vehicle 52 is present in the front of the host vehicle 51 as shown in FIG. 14C, when the other vehicle 52 is present obliquely to the host vehicle 51 as shown in FIG. 14D, and when the other vehicle 52 is present in parallel to the host vehicle 51 as shown in FIG. 14E.

Therefore, it is possible to more surely avoid malfunction at the time when the occupants of the host vehicle and the other vehicle operate the keyless entry system, without being affected by the stop state of the other vehicle 52.

Explanation of a Fifth Embodiment

Figure 15:
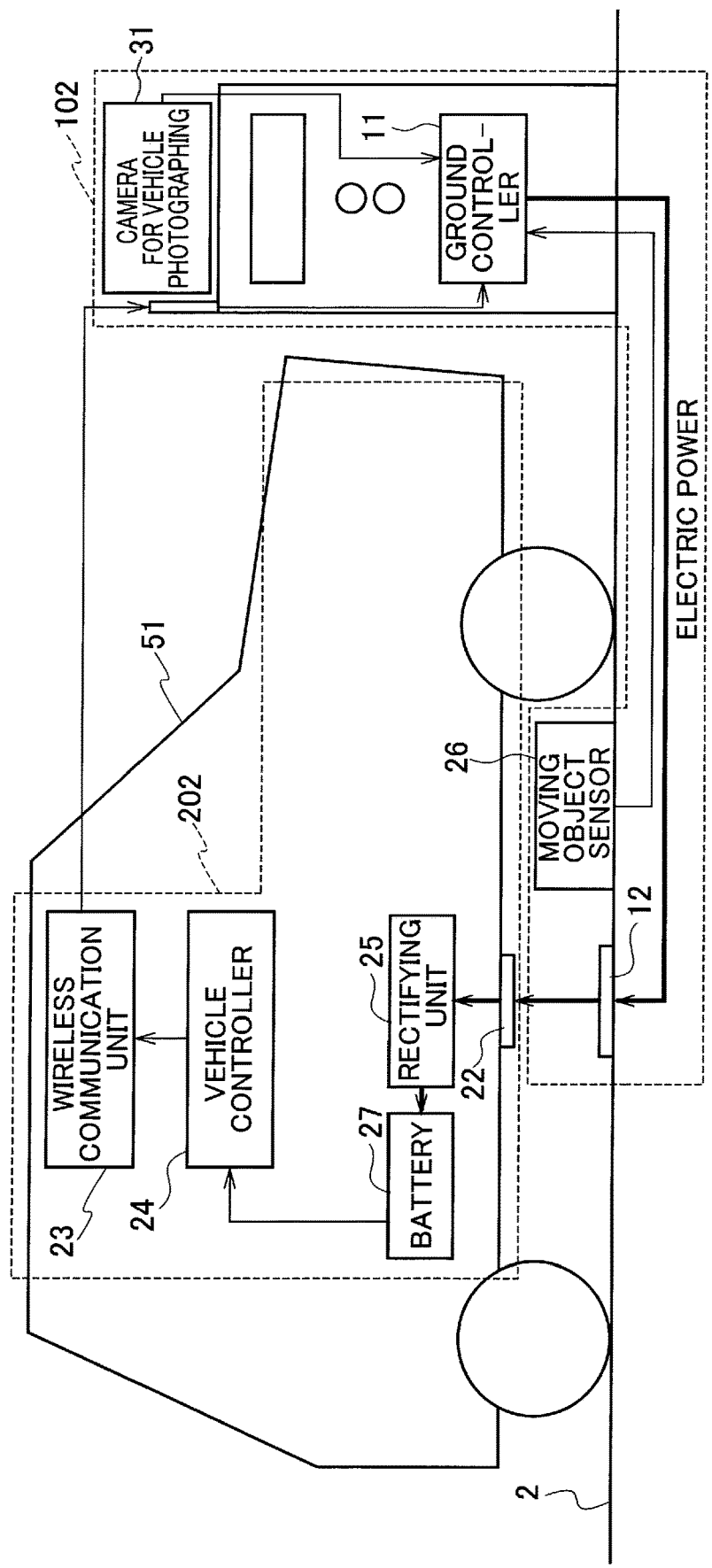
FIG. 15 is a block diagram showing the configuration of a non-contact electric power supply system according to a fifth embodiment of the present invention.
Figure 16:
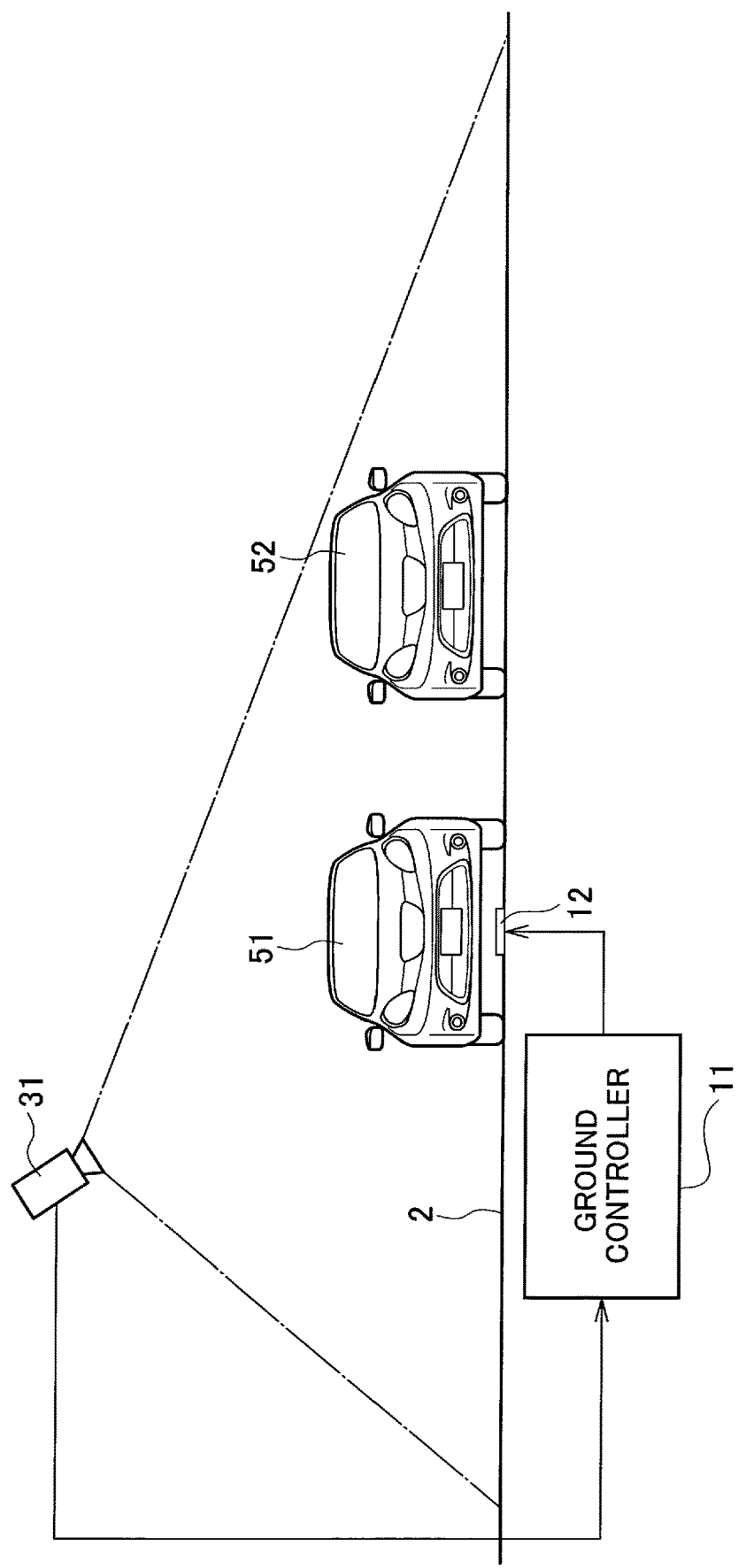
FIG. 16 is an explanatory diagram relating to the fifth embodiment of the present invention and showing a state in which a vehicle parked in a parking space is photographed by a camera.

A fifth embodiment of the present invention will be explained. In the fifth embodiment, a camera 31 for vehicle-photographing that photographs the periphery of a host vehicle in the parking space 2 is provided. Presence or absence of the other vehicle 52 adjacent to the host vehicle 51 is determined based on an image photographed by the camera 31 for vehicle-photographing. FIG. 15 is a block diagram showing the configuration of a non-contact electric power supply system according to the fifth embodiment. FIG. 16 is an explanatory diagram showing a state in which the entire parking space 2 is photographed using the camera 31 for vehicle-photographing. The fifth embodiment is different from FIG. 1 in that an electric power supply device 102 includes the camera 31 for vehicle-photographing that photographs the parking space 2 and an electric power receiving device 202 does not include the distance sensors 28. The other components are the same as the components shown in FIG. 1. Therefore, the components are denoted by the same reference numerals and signs. Explanation of the components is omitted.

As shown in FIG. 16, it is possible to photograph the host vehicle 51 and the other vehicle 52 with the camera 31 for vehicle-photographing. The ground controller 11 analyzes an image photographed by the camera 31 for vehicle-photographing and determines whether the other vehicle 52 adjacent to the host vehicle 51 is present.

As in the first embodiment explained above, the ground controller 11 sets the detection regions of the Doppler sensors 262 based on presence or absence of the other vehicle 52. Specifically, as shown in FIG. 6A, when the other vehicle 52 is absent, the detection regions of the Doppler sensors 262 are set to R1. As shown in FIG. 6B, when the other vehicle 52 is present, the detection region of the Doppler sensor 262 is set to R11. Consequently, it is possible to obtain the same effects as the effects of the first embodiment explained above.

In this way, in the non-contact electric power supply system according to the fifth embodiment, the other vehicle 52 adjacent to the host vehicle 51 is detected using the camera 31 for vehicle-photographing that photographs the entire parking space 2. Therefore, it is unnecessary to provide the distance sensor 28 such as the sonar 281. It is possible to reduce devices and components mounted on the host vehicle 51.

Explanation of a Sixth Embodiment

A sixth embodiment of the present invention will be explained. In the sixth embodiment, the front, the sides, and the rear of the host vehicle 51 are detected using the cameras 282 (282a to 282c) shown in FIG. 3 as the distance sensors 28 that detects an object around the host vehicle 51. The configuration of a system is the same as the configuration of the non-contact electric power supply system shown in FIG. 1 explained above. Therefore, explanation of the configuration of the system is omitted. Processing performed when the other vehicle 52 adjacent to a side of the host vehicle 51 is present is the same as the processing in the first embodiment explained above.

In the sixth embodiment, it is determined using the front camera 282a (see FIG. 3) whether another vehicle is present in the front of the host vehicle 51. When another vehicle is absent, detection data of the Doppler sensor 262 that detects the front of the host vehicle 51 is invalidated. That is, even when a moving object is detected in the front of the host vehicle 51, a detection result of the moving object is invalidated.

Figure 17:
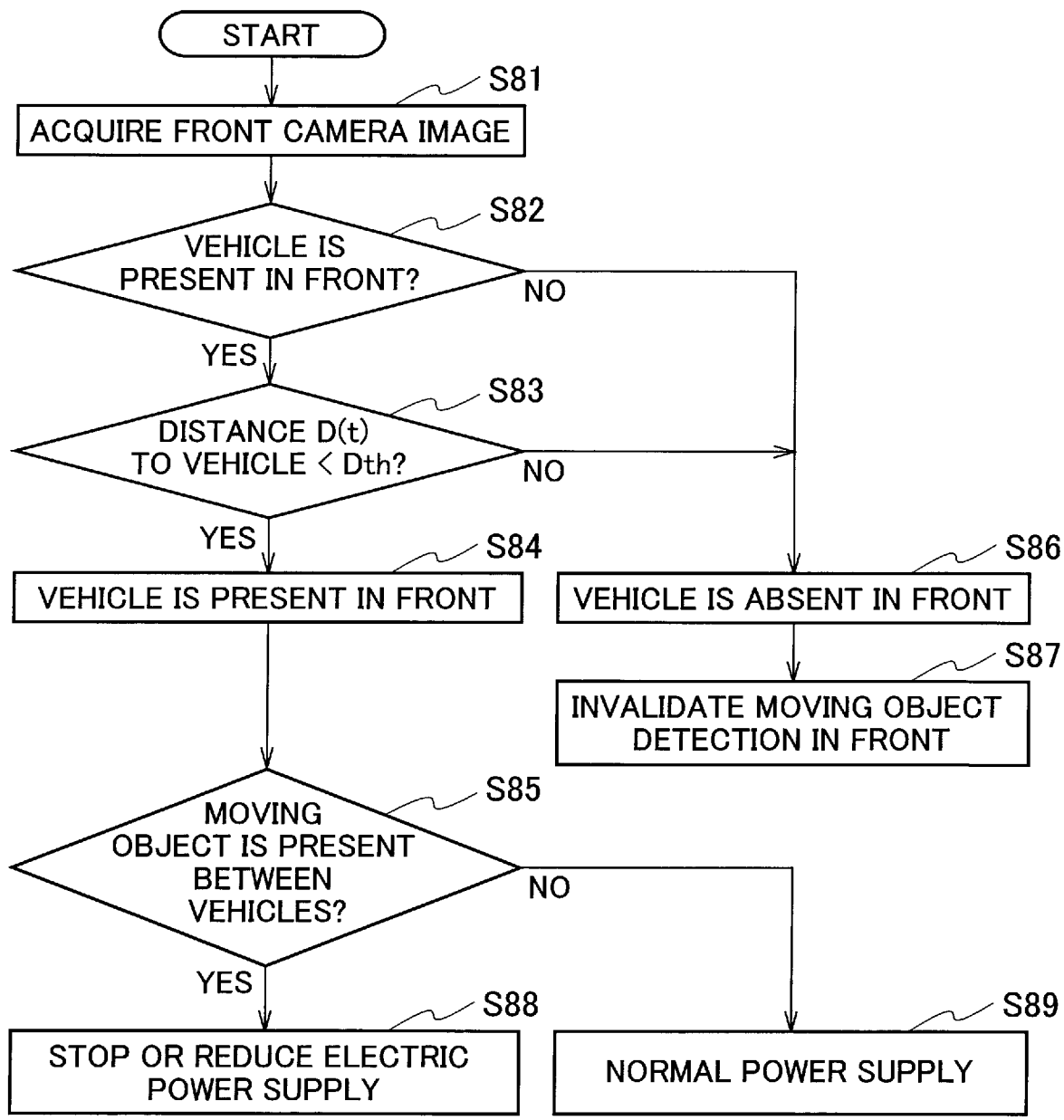
FIG. 17 is a flowchart showing processing of a non-contact electric power supply system according to a sixth embodiment of the present invention.
Figure 18A:
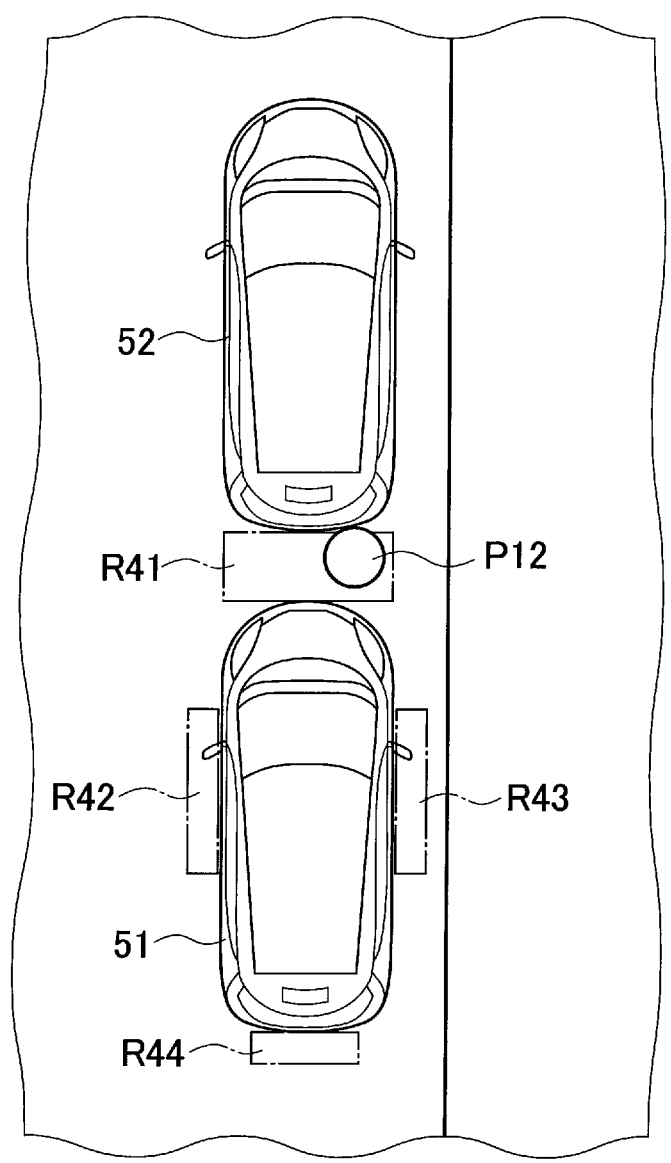
FIG. 18A is an explanatory diagram relating to the sixth embodiment of the present invention and showing a state in which another vehicle is parked in the front of a host vehicle.
Figure 18B:
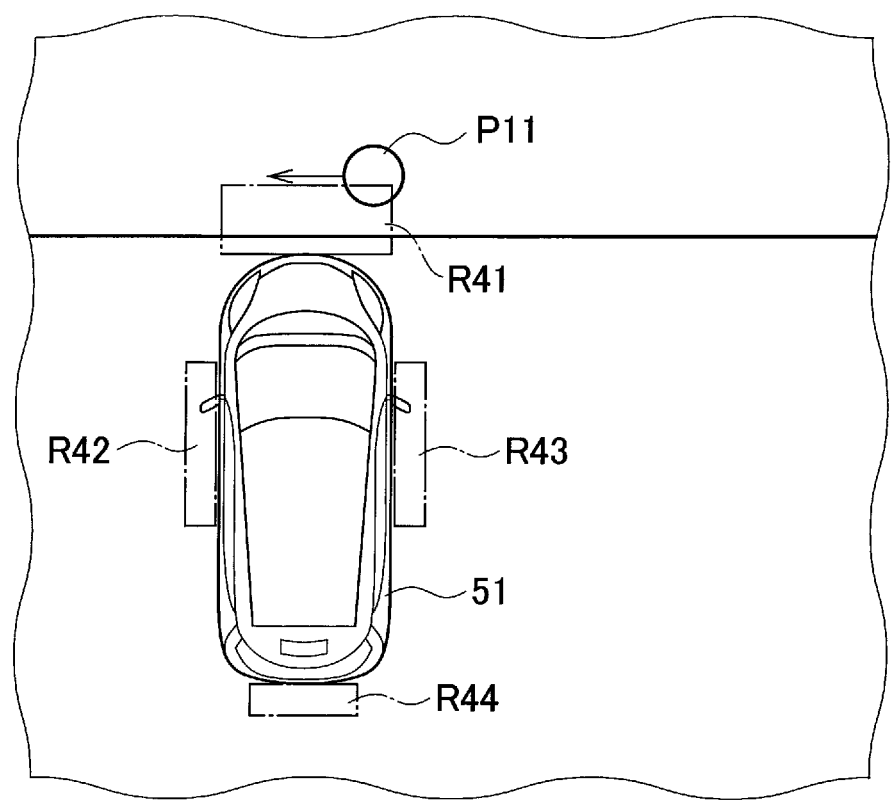
FIG. 18B is an explanatory diagram relating to the sixth embodiment of the present invention and showing a state in which another vehicle is not parked in the front of a host vehicle.

In the following explanation, action of the sixth embodiment will be explained with reference to a flowchart in FIG. 17 and explanatory diagrams in FIG. 18A and FIG. 18B. First, in step S81, the vehicle controller 24 acquires an image of the front of the host vehicle 51 photographed by the front camera 282a (the distance sensor 28).

In step S82, the vehicle controller 24 analyzes the image of the front and determines whether another vehicle is present in the front of the host vehicle 51.

When another vehicle is present (YES in step S82), the vehicle controller 24 advances the processing to step S83. When another vehicle is absent (NO in step S82), the vehicle controller 24 advances the processing to step S86.

In step S83, the vehicle controller 24 determines whether the distance D(t) to the other vehicle in the front is smaller than the threshold distance Dth.

When "D(t)<Dth" (YES in step S83), in step S84, the vehicle controller 24 determines whether another vehicle is present in the front. As shown in FIG. 18A, the other vehicle 52 is present in the front of the host vehicle 51.

Thereafter, in step S85, the vehicle controller 24 determines, based on detection data of the Doppler sensors 262, whether a moving object is present between the host vehicle 51 and the other vehicle 52. For example, when an occupant P12 (a moving object) who operates the keyless entry system behind the other vehicle 52 is present as shown in FIG. 18A, the presence of the occupant P12 is detected. When the occupant P12 is detected, in step S88, the vehicle controller 24 transmits a command signal for stopping or reducing electric power supply to the ground controller 11. The ground controller 11 stops or reduces the electric power supply to the electric power transmitting coil 12.

Therefore, when the occupant P12 of the other vehicle 52 operates the keyless entry system, it is possible to avoid a situation in which the operation of the keyless entry system affects a wireless signal. When a moving object is not detected in the front of the host vehicle 51 (NO in step S85), in step S89, the vehicle controller 24 returns the electric power supply to the normal electric power supply.

On the other hand, when it is determined that another vehicle is absent in the front of the host vehicle 51 (NO in step S82) or when the distance to the front vehicle is larger than threshold distance Dth (NO in step S83), in step S86, the vehicle controller 24 determines that a vehicle is absent in the front of the host vehicle 51.

Further, in step S87, the vehicle controller 24 invalidates the detection of the moving object in the front of the host vehicle 51. That is, when a vehicle is absent in the front of the host vehicle 51 as shown in FIG. 18B, the vehicle controller 24 invalidates the detection of the moving object in the detection region R3 (see FIG. 5) in the front by the Doppler sensor 262. Therefore, for example, when a pedestrian P11 is walking on a sidewalk in the front of the host vehicle 51 shown in FIG. 18B, it is possible to prevent occurrence of malfunction of detecting the pedestrian P11 as a moving object and stopping or reducing the electric power supply.

In this way, in the non-contact electric power supply system according to the sixth embodiment, the front and the sides of the host vehicle 51 are set as the detection regions for a moving object. Therefore, when the occupant P12 of the other vehicle 52 parked in the front of the host vehicle 51 operates the keyless entry system, for example, in a back door, it is possible to avoid a situation in which the operation of the keyless entry system affects a wireless signal. Further, when the host vehicle 51 is parked in a parking space facing a region such as a sidewalk where many pedestrians pass, detection of a moving object in the front of the host vehicle 51 is invalidated. Therefore, it is possible to prevent malfunction of detecting a pedestrian on the sidewalk and stopping or reducing the electric power supply.

The method for controlling a non-contact electric power supply system and the non-contact electric power supply system of the present invention are explained above based on the illustrated embodiments. However, the present invention is not limited to those. The components can be replaced with any components having the same functions.

REFERENCE SIGNS LIST 2 parking space
11 ground controller
12 electric power transmitting coil
22 electric power receiving coil
23 wireless communication unit
24 vehicle controller
25 rectifying unit
26 moving object sensor
27 battery
28 distance sensor
31 camera for vehicle-photographing
32 sidewalk
33 wall
51 host vehicle
52 another (other) vehicle
100, 101, 102 electric power supply device
200, 201, 202 electric power receiving device
262 Doppler sensor
281 sonar
281a front sonar
281b front corner sonar
281c front side sonar
281d rear side sonar
281e rear corner sonar 281f rear sonar
282 camera
282a front camera
282b side camera
282c rear camera
C1 center line
P1 occupant
P2 occupant
P11 pedestrian
P12 occupant

The invention claimed is:

1. A method for controlling a non-contact electric power supply system in which an electric power receiving coil mounted on a host vehicle is opposed to an electric power transmitting coil set on a ground, the non-contact electric power supply system supplying electric power from the electric power transmitting coil to the electric power receiving coil in a non-contact manner and, when a moving object is detected in a detection region around the electric power receiving coil or the electric power transmitting coil during the electric power supply, stopping or reducing the electric power supply, the method comprising:
 determining whether another vehicle is parked adjacent to the host vehicle;
 expanding, when determining that the another vehicle is parked, the detection region as compared to when not determining that the another vehicle is parked; and
 detecting a distance to the another vehicle using distance sensors that are respectively provided on a side in a front and a side in a rear of the host vehicle and setting the detection region according to the distance to the another vehicle detected by the respective distance sensors.

2. The method for controlling the non-contact electric power supply system according to claim 1, further comprising detecting a moving object in the detection region with a moving object sensor set in the host vehicle.

3. The method for controlling the non-contact electric power supply system according to claim 1, further comprising detecting a moving object in the detection region with a moving object sensor set on the ground.

4. The method for controlling the non-contact electric power supply system according to claim 1, wherein the detection region includes a side and a front of the host vehicle.

5. The method for controlling the non-contact electric power supply system according to claim 1, further comprising determining, with a camera that is set on the ground and photographs a periphery of the host vehicle, whether the another vehicle is parked near the host vehicle.

6. The method for controlling the non-contact electric power supply system according to claim 1, further comprising, after a moving object is detected in the detection region and the electric power supply is stopped or reduced, starting the electric power supply or returning the electric power supply to normal electric power supply when a preset interruption time elapses without a moving object being detected in the detection region.

7. A non-contact electric power supply system in which an electric power receiving coil mounted on a host vehicle is to be opposed to an electric power transmitting coil set on a ground, and electric power is to be supplied from the electric power transmitting coil to the electric power receiving coil in a non-contact manner, the non-contact electric power supply system comprising:
 distance sensors that detect whether another vehicle is parked adjacent to the host vehicle;
 a moving object sensor that detects whether a moving object is present around the host vehicle; and
 an electric-power-supply control circuit that stops or reduces the electric power supply when a moving object is detected by the moving object sensor, wherein
 when it is detected that the another vehicle is parked, a detection region of the moving object sensor is expanded as compared to when it is not detected that the another vehicle is parked,
 a distance to the another vehicle is detected by using the distance sensors that are respectively provided on a side in a front and a side in a rear of the host vehicle, and
 the detection region is set according to the distance to the another vehicle detected by the respective distance sensors.

8. A method for controlling a non-contact electric power supply system in which an electric power receiving coil mounted on a host vehicle is opposed to an electric power transmitting coil set on a ground, the non-contact electric power supply system supplying electric power from the electric power transmitting coil to the electric power receiving coil in a non-contact manner and, when a moving object is detected in a detection region around the electric power receiving coil or the electric power transmitting coil during the electric power supply, stopping or reducing the electric power supply, the method comprising:
 determining whether another vehicle is parked adjacent to the host vehicle; and
 in response to determining that the another vehicle is parked, expanding the detection region as compared to when not determining that the another vehicle is parked, wherein the detection region is a detection region of a moving object sensor which is set in the host vehicle or on an area of the ground facing a bottom of the host vehicle.

* * * * *